US012580876B2

(12) United States Patent　　　　(10) Patent No.:　US 12,580,876 B2
Arunachalam et al.　　　　　　　　　(45) Date of Patent:　　Mar. 17, 2026

(54) DYNAMIC SKILL HANDLING MECHANISM FOR BOT PARTICIPATION IN SECURE MULTI-USER COLLABORATION WORKSPACES

(71) Applicant: Cisco Technology, Inc., San Jose, CA (US)

(72) Inventors: Chidambaram Arunachalam, Apex, NC (US); Gonzalo Salgueiro, Raleigh, NC (US); David deMilo, Coeur D'Alene, ID (US); Kevin Elrod, Durham, NC (US); Felipe De Mello, Holly Springs, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 176 days.

(21) Appl. No.: 18/489,208

(22) Filed: Oct. 18, 2023

(65) Prior Publication Data

US 2024/0048511 A1　　Feb. 8, 2024

Related U.S. Application Data

(62) Division of application No. 17/034,774, filed on Sep. 28, 2020, now Pat. No. 11,888,790.

(Continued)

(51) Int. Cl.
H04L 51/02　　　　(2022.01)
H04L 9/40　　　　(2022.01)
(Continued)

(52) U.S. Cl.
CPC .......... H04L 51/02 (2013.01); H04L 12/1822 (2013.01); H04L 51/046 (2013.01); H04L 63/102 (2013.01); H04L 63/105 (2013.01)

(58) Field of Classification Search
CPC ... H04L 51/02; H04L 51/046; H04L 12/1818; H04L 12/1822; H04L 63/102; H04L 63/105
See application file for complete search history.

(56) References Cited

U.S. PATENT DOCUMENTS 7,603,413 B1　　10/2009　Herold et al.
9,691,388 B2　　6/2017　Bodin et al.
(Continued)

OTHER PUBLICATIONS

Cisco, "TAC Connect," https://tacconnect.cisco.com, Sep. 2020, 59 pages.

(Continued)

*Primary Examiner* — Madhu Woolcock
(74) *Attorney, Agent, or Firm* — Edell, Shapiro & Finnan, LLC

(57) ABSTRACT

A system and method for creating a context-aware, conversational chat bot or agent in multi-party conversations where participants have different levels of security access to information and the bot operates in one or more modes depending on the business context of the multi-user collaboration virtual workspace. The methods include adding a bot, as a participant, to a virtual workspace that is a multi-user collaboration workspace, obtaining, at a bot application server, context of the virtual workspace, setting, by the bot application server, a skill set for the bot from among a plurality of skill sets. The skill set varies based on the context of the virtual workspace. The methods further include configuring, by the bot application server, the bot to perform at least one task in the virtual workspace based on the skill set.

20 Claims, 12 Drawing Sheets

Related U.S. Application Data

(60) Provisional application No. 63/044,492, filed on Jun. 26, 2020.

(51) Int. Cl.
H04L 12/18 (2006.01)
H04L 51/046 (2022.01)

(56) References Cited

U.S. PATENT DOCUMENTS

| | | | |
|---|---|---|---|
| 10,257,241 B2 | 4/2019 | Griffin | |
| 10,733,329 B1 | 8/2020 | Ragupathy et al. | |
| 10,891,947 B1 | 1/2021 | Le Chevalier | |
| 11,074,603 B1 | 7/2021 | Smith | |
| 11,146,599 B1 | 10/2021 | Jackson et al. | |
| 11,157,847 B2 | 10/2021 | Abhinav et al. | |
| 11,494,440 B1 | 11/2022 | Black et al. | |
| 2003/0217105 A1 | 11/2003 | Zircher et al. | |
| 2005/0210396 A1 | 9/2005 | Galli | |
| 2006/0195816 A1 | 8/2006 | Grandcolas et al. | |
| 2007/0226032 A1 | 9/2007 | White et al. | |
| 2009/0158278 A1* | 6/2009 | De-Kay | H04L 67/564 |
| | | | 718/100 |
| 2011/0055299 A1* | 3/2011 | Phillips | G06F 9/45533 |
| | | | 707/827 |
| 2012/0030289 A1 | 2/2012 | Buford et al. | |
| 2013/0166275 A1 | 6/2013 | Yang et al. | |
| 2014/0310365 A1 | 10/2014 | Sample et al. | |
| 2014/0372536 A1* | 12/2014 | Ahlgren | G06Q 10/10 |
| | | | 709/205 |
| 2015/0100503 A1* | 4/2015 | Lobo | G06Q 10/103 |
| | | | 705/301 |
| 2016/0100019 A1* | 4/2016 | Leondires | H04L 63/105 |
| | | | 709/204 |
| 2016/0321469 A1 | 11/2016 | Bhogal et al. | |
| 2017/0163649 A1 | 6/2017 | Ananthanarayanan et al. | |
| 2017/0286155 A1 | 10/2017 | Hosabettu et al. | |
| 2017/0288942 A1 | 10/2017 | Plumb et al. | |
| 2017/0289168 A1* | 10/2017 | Bar | H04L 63/1408 |
| 2017/0295114 A1 | 10/2017 | Goldberg et al. | |
| 2017/0366479 A1 | 12/2017 | Ladha et al. | |
| 2018/0032576 A1 | 2/2018 | Romero | |
| 2018/0063675 A1 | 3/2018 | Raghav | |
| 2018/0083894 A1 | 3/2018 | Fung et al. | |
| 2018/0109526 A1 | 4/2018 | Fung et al. | |
| 2018/0131643 A1* | 5/2018 | Trufinescu | G06F 3/048 |
| 2018/0152411 A1 | 5/2018 | Lee et al. | |
| 2018/0300646 A1 | 10/2018 | Landowski et al. | |
| 2018/0322403 A1 | 11/2018 | Ron et al. | |
| 2018/0366118 A1* | 12/2018 | Lovitt | G10L 15/063 |
| 2019/0018657 A1* | 1/2019 | Landowski | G06F 8/60 |
| 2019/0028591 A1 | 1/2019 | Kumar et al. | |
| 2019/0044829 A1 | 2/2019 | Balzer et al. | |
| 2019/0089656 A1 | 3/2019 | Johnson, Jr. et al. | |
| 2019/0268387 A1 | 8/2019 | Pelton et al. | |
| 2019/0297032 A1 | 9/2019 | Zhang et al. | |
| 2019/0297039 A1 | 9/2019 | Rodriguez et al. | |
| 2019/0303218 A1 | 10/2019 | Kantor et al. | |
| 2019/0349477 A1* | 11/2019 | Kotak | H04M 3/4878 |
| 2019/0392395 A1* | 12/2019 | Valliani | G06Q 10/109 |
| 2020/0036658 A1 | 1/2020 | Elango et al. | |
| 2020/0044998 A1 | 2/2020 | Jeon et al. | |
| 2020/0065523 A1 | 2/2020 | Fukuda | |
| 2020/0075022 A1* | 3/2020 | DeLuca | G10L 17/00 |
| 2020/0084123 A1 | 3/2020 | Kline et al. | |
| 2020/0099633 A1 | 3/2020 | D'Agostino et al. | |
| 2020/0099637 A1* | 3/2020 | Kurokawa | H04N 1/00875 |
| 2020/0099642 A1 | 3/2020 | Mishima et al. | |
| 2020/0125901 A1* | 4/2020 | Pelov | G06F 18/217 |
| 2020/0134211 A1 | 4/2020 | Miller et al. | |
| 2020/0279567 A1* | 9/2020 | Adlersberg | G06F 40/35 |
| 2020/0304437 A1 | 9/2020 | Sasamae et al. | |
| 2020/0306638 A1* | 10/2020 | Fear | A63F 13/56 |
| 2020/0348960 A1 | 11/2020 | Krishnamurthy et al. | |
| 2020/0348964 A1 | 11/2020 | Anand et al. | |
| 2021/0036973 A1* | 2/2021 | Venkateshwaran | |
| | | | H04L 41/5074 |
| 2021/0075632 A1* | 3/2021 | Kapinos | H04L 65/1093 |
| 2021/0144264 A1 | 5/2021 | Toda et al. | |
| 2021/0173718 A1 | 6/2021 | Patel et al. | |
| 2021/0314282 A1* | 10/2021 | Sharma | G06F 3/167 |
| 2022/0078139 A1* | 3/2022 | Sreenivasan | G16H 80/00 |

OTHER PUBLICATIONS

Ferraro, Giovanna et al., "Organizing Collaboration in Inter-organizational Innovation Networks, from Orchestration to Choreography," DOI: 10.5772/61802, Oct. 20, 2015, 14 pages.

Rucker, Bernd, "Why service collaboration needs choreography and orchestration," Apr. 13, 2017, 6 pages.

Global Relay Communications Inc., "Global Relay Information Governance Model," https://globalrelay.com/solution/information-governance, downloaded Sep. 28, 2020, 4 pages.

Smooch Technologies ULC, "Integrate and orchestrate multiple systems in the conversation stream", https://smooch.io/orchestrator/, downloaded Sep. 28, 2020, 8 pages.

Nambisan, Satish et al., "Orchestration Processes in Network-Centric Innovation: Evidence From the Field," Aug. 2011,19 pages.

Slagter, et al., "Service Orchestration for Collaboration Patterns," CTIT Technical Report Series, Centre for Telematics and Information Technology, University of Twente, Dec. 2005, 35 pages.

\* cited by examiner

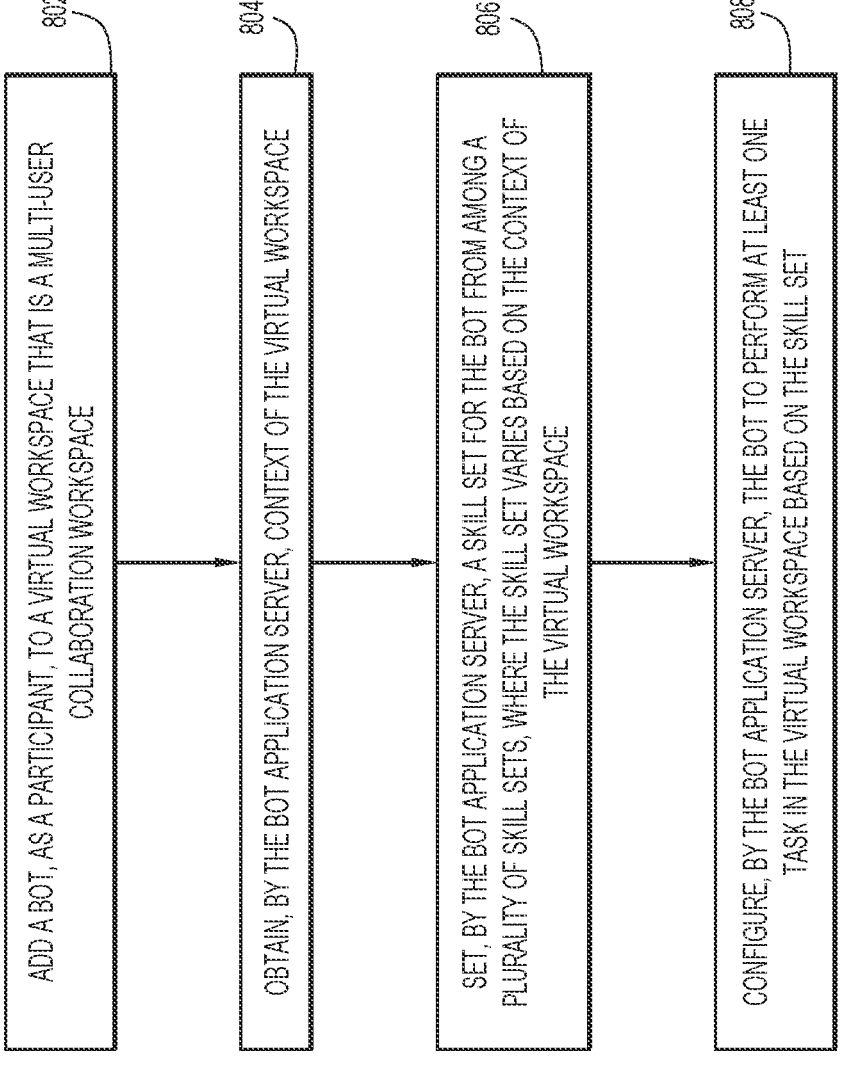

ADD A BOT, AS A PARTICIPANT, TO A VIRTUAL WORKSPACE THAT IS A MULTI-USER COLLABORATION WORKSPACE ⟶ 802

OBTAIN, BY THE BOT APPLICATION SERVER, CONTEXT OF THE VIRTUAL WORKSPACE ⟶ 804

SET, BY THE BOT APPLICATION SERVER, A SKILL SET FOR THE BOT FROM AMONG A PLURALITY OF SKILL SETS, WHERE THE SKILL SET VARIES BASED ON THE CONTEXT OF THE VIRTUAL WORKSPACE ⟶ 806

CONFIGURE, BY THE BOT APPLICATION SERVER, THE BOT TO PERFORM AT LEAST ONE TASK IN THE VIRTUAL WORKSPACE BASED ON THE SKILL SET ⟶ 808

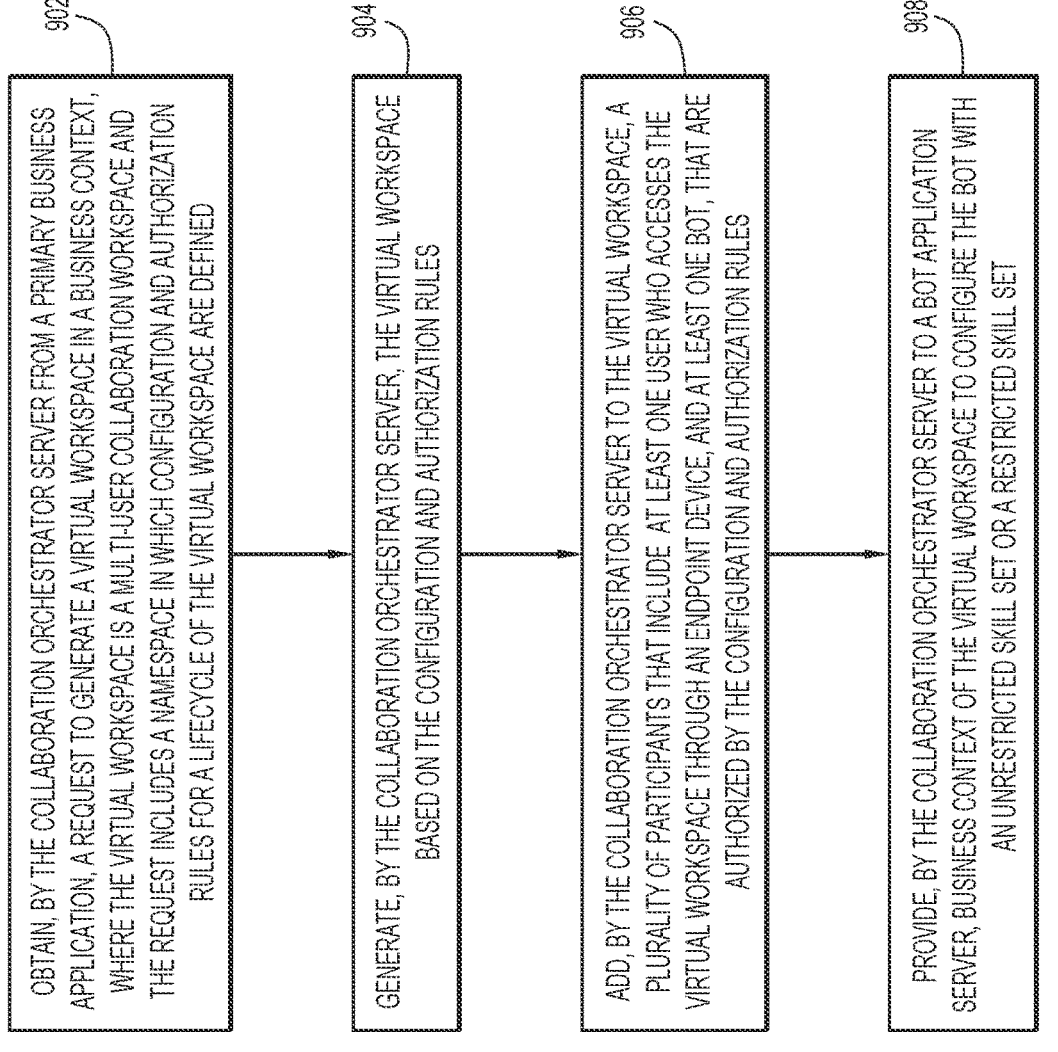

902 — OBTAIN, BY THE COLLABORATION ORCHESTRATOR SERVER FROM A PRIMARY BUSINESS APPLICATION, A REQUEST TO GENERATE A VIRTUAL WORKSPACE IN A BUSINESS CONTEXT, WHERE THE VIRTUAL WORKSPACE IS A MULTI-USER COLLABORATION WORKSPACE AND THE REQUEST INCLUDES A NAMESPACE IN WHICH CONFIGURATION AND AUTHORIZATION RULES FOR A LIFECYCLE OF THE VIRTUAL WORKSPACE ARE DEFINED

904 — GENERATE, BY THE COLLABORATION ORCHESTRATOR SERVER, THE VIRTUAL WORKSPACE BASED ON THE CONFIGURATION AND AUTHORIZATION RULES

906 — ADD, BY THE COLLABORATION ORCHESTRATOR SERVER TO THE VIRTUAL WORKSPACE, A PLURALITY OF PARTICIPANTS THAT INCLUDE AT LEAST ONE USER WHO ACCESSES THE VIRTUAL WORKSPACE THROUGH AN ENDPOINT DEVICE, AND AT LEAST ONE BOT, THAT ARE AUTHORIZED BY THE CONFIGURATION AND AUTHORIZATION RULES

908 — PROVIDE, BY THE COLLABORATION ORCHESTRATOR SERVER TO A BOT APPLICATION SERVER, BUSINESS CONTEXT OF THE VIRTUAL WORKSPACE TO CONFIGURE THE BOT WITH AN UNRESTRICTED SKILL SET OR A RESTRICTED SKILL SET

DYNAMIC SKILL HANDLING MECHANISM FOR BOT PARTICIPATION IN SECURE MULTI-USER COLLABORATION WORKSPACES

CROSS-REFERENCE TO RELATED APPLICATION

This application is a divisional application of U.S. patent application Ser. No. 17/034,774, filed on Sep. 28, 2020, now U.S. Pat. No. 11,888,790, which claims priority to U.S. Provisional Application No. 63/044,492, filed on Jun. 26, 2020, the contents of each of which are incorporated herein by reference in their entireties.

TECHNICAL FIELD

The present disclosure relates to artificial intelligent agents.

BACKGROUND

The usage of artificial intelligent agents or virtual assistants, commonly referred to as "bots", in supporting workflows is becoming prevalent and customers are willing to use them to assist in completing certain tasks. For example, a bot may be used for network or datacenter technical support. The bot may be multi-skilled and can perform different tasks such as giving latest status summary for a given support ticket, escalating a support ticket, re-queuing a support ticket, and/or raising severity of a support ticket.

Users may interact with a bot in 1:1 collaboration virtual spaces. In such an environment, the bot determines whether a user is authorized to view the details of the support ticket, for example. That is, user A in company A may be allowed to only view company A's cases and not view company B's cases. The 1:1 space limits the functional use of the bot.

BRIEF DESCRIPTION OF THE DRAWINGS

FIG. 8 is a flowchart illustrating a method of configuring a bot in a multi-user collaboration space or a virtual workspace, according to an example embodiment.

FIG. 9 is a flowchart illustrating a method of creating a multi-user collaboration space or a virtual workspace with bot participation, according to an example embodiment.

DESCRIPTION OF EXAMPLE EMBODIMENTS

Overview

Figure 1:
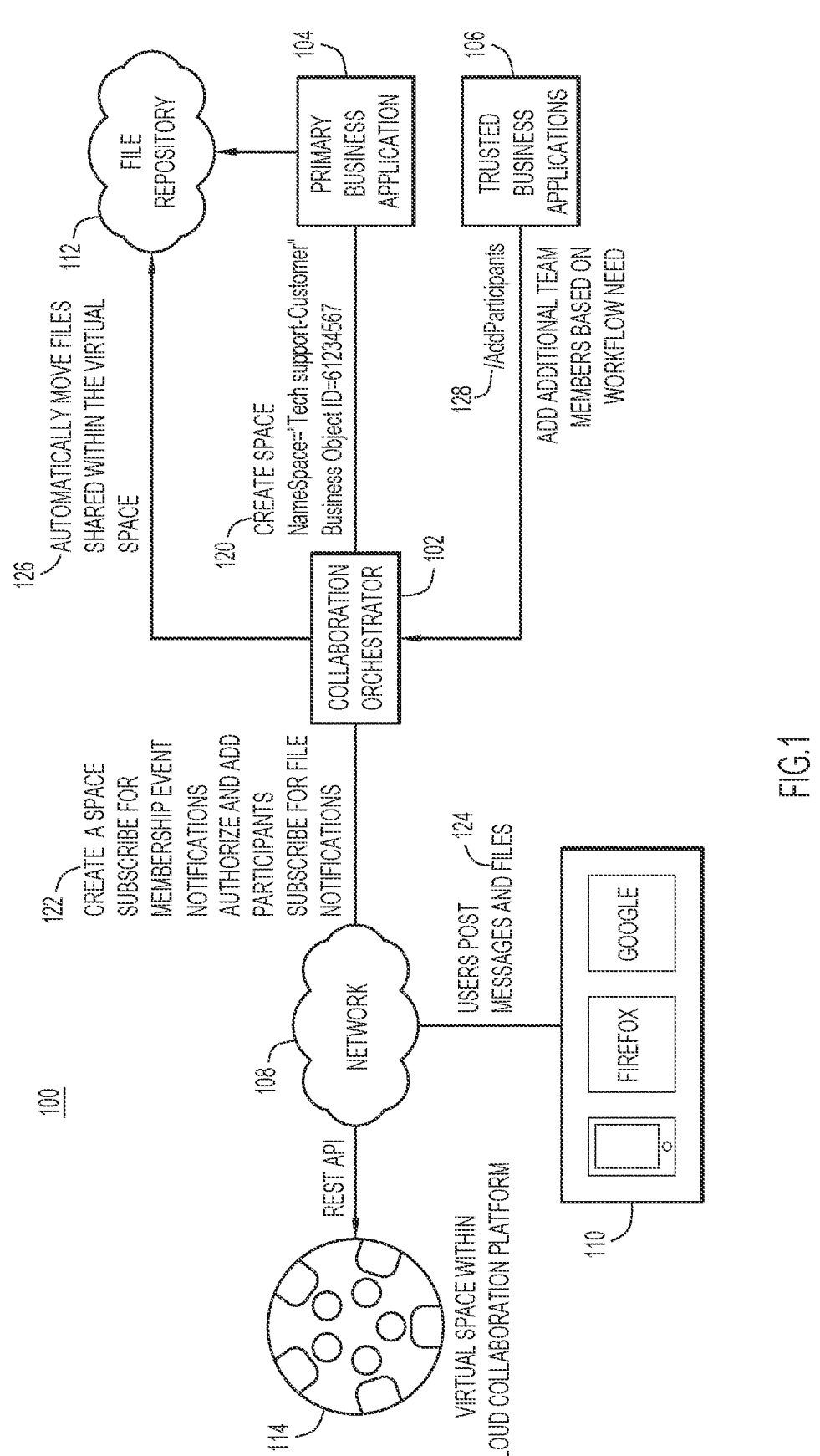
FIG. 1 is a high-level functional block diagram of a system configured to create virtual workspaces, according to an example embodiment.

Briefly, systems and methods are provided for creating a context-aware, conversational chat bot or agent in multi-party conversations, where participants have different levels of security access to information. The bot operates in one or more modes, from a restricted mode with a reduced set of skill to an unrestricted mode with all skills enabled depending on the business context of the multi-user collaboration virtual space.

In these systems and methods, a bot is added, as a participant, to a virtual workspace that is a multi-user collaboration workspace. A bot application server obtains context of the virtual workspace and sets a skill set for the bot from among a plurality of skill sets. The skill set varies based on the context of the virtual workspace. The bot application server configures the bot to perform at least one task in the virtual workspace based on the skill set.

Additionally, in these systems and methods, a collaboration orchestrator server obtains, from a primary business application, a request to generate a virtual workspace in a business context. The virtual workspace is a multi-user collaboration workspace. The collaboration orchestrator server generates the virtual workspace based on the configuration and authorization rules, and adds to the virtual workspace a plurality of participants that include at least one user participant, and at least one bot, that are authorized by the configuration and authorization rules. The collaboration orchestrator server provides, to a bot application server, business context of the virtual workspace to configure the bot with an unrestricted skill set or a restricted skill set.

EXAMPLE EMBODIMENTS

Enterprise messaging platforms have enabled businesses to remove communication barriers such as email ping-pongs with their customers, partners, and employees, to foster teamwork and collaboration. These messaging platforms provide a persistent collaboration "virtual workspace" in which participants can exchange messages, share files, invoke audio and video communications and even interact with bots. Often, these virtual workspaces are manually created by a human in an ad-hoc fashion to facilitate communication among a group to accomplish a specific point objective, such as to solve a customer problem or diagnose an issue reported by a customer. These manually created virtual workspaces are unmanaged, ungoverned, and insecure. That is, there is no systematic mechanism to check whether the participants being added to the virtual workspace are authorized to view and access the data exchanged within the virtual workspace.

Enterprises are starting to enforce security and data protection rules by having the virtual workspaces created by a business application, such as case management or a healthcare and patient care application, and associating the virtual workspace to a business object such as a support case or a medical case and implementing policy enforcement logic within the business application. Existing mechanisms, however, are business application specific. That is, the logic for creating and deleting a virtual workspace is implemented individually within a business application. Further, the business application individually enforces business rules, such as who is authorized to participate in the virtual workspace, capturing knowledge by automatically exporting the conversation transcripts to the business object, moving diagnostics data to a secured and business approved storage system.

Techniques presented herein provide for a mechanism to invoke these repeatable, virtual workspace management tasks in a consistent, programmatic and messaging platform agnostic manner. Additionally, techniques presented below provide for collaboration between various adjacent trusted business applications, such as logistics applications and/or escalation management application in a support workflow, that closely relate to the primary business object e.g., a support case. In other words, these techniques provide a mechanism for a primary application e.g. the case management application, to work with other related applications such that other related applications (secondary applications) obtain access to the virtual workspace to complete tasks. The tasks may include posting relevant messages e.g., Return Material Authorization (RMA) order delivery related messages, and/or adding one or more participants from inter-related organizations (an agent from a logistics team).

The techniques presented below further provide for a mechanism to manage the lifecycle of a secure collaboration virtual workspace including enabling access to various inter-related business applications using namespaces.

A namespace is a set of configuration rules, authorization rules, moderation and conversation monitoring method, and the records retention policies and process to be used for managing collaboration virtual workspace of a given type or kind. The namespaces are defined based on policies and processes for various collaboration workflows within a business. For example, the authorization rules for a collaboration virtual workspace used to support workflows are inherently different from the ones used for sales workflows. The authorization rules may also change based on a use case for the virtual workspace. Similarly, file retention policies are different for support and sales organizations. As such, the namespace is a super-set of policies that includes specific configuration templates and/or rules and/or authorization policies for a particular virtual workspace. A namespace specifies modality, access rules, a moderation and conversation monitoring method, and/or a record retention process for this virtual workspace. It also assigns metadata to each session which binds the session to an externally managed business object i.e., links the virtual workspace to a business object.

Dereferencing a namespace as a programmable entity creates the configuration and authorization states. The configuration and authorization states vary depending on a stage in the lifecycle of the virtual collaboration workspace. That is, each namespace maybe divided into two or more stages based on the lifecycle of the virtual collaboration workspace.

For example, stage 1 is at the time of creation of the virtual collaboration workspace. At the time of creation, the namespace defines a first set of configuration and authorization rules. Stage 2 is at the time the virtual collaboration space is actively being used (after it is created but before it is deleted). During stage 2, the namespace defines a second set of configuration and authorization rules. Stage 3 is at the time the virtual collaboration space is deleted. At the time of the deletion, the namespace defines a third set of configuration and authorization rules.

Some examples of various namespaces are provided below. These namespaces manage various multi-user collaboration virtual workspaces that include at least one or more user participants and one or more bot.

Example 1: Technical Support to Customer. This is a support use case and is a namespace for an external virtual collaboration workspace in which technical support is provided to a customer.

Stage 1 includes one or more of the following configuration rules or a series of tasks that needs to be performed when this virtual collaboration workspace is to be created:

1. Create a workspace.
2. Invite participants.
3. Post a welcome message.
4. Post customer journey insights. That is, information about the case is shared in this virtual workspace.
5. Configure the workspace to monitor for file upload events.
6. Attach customer-specific and incident-specific email exploders.

Stage 1 further includes one or more authorization rules. The authorization rules help protect sensitive or proprietary data. The authorization rules may be configured to perform tasks:

1. Allow external users only if they have authorization to case data e.g., a customer of the case data which is being addressed.
2. Potentially limit per-domain rules (e.g., @customer.example.com identities and @companyname.com domains).
3. Allow support engineers with case view validated authorization.
4. Allow only information-security approved external bots.
5. Allow only the case owner as a moderator. Since in the external workspace anyone can invite anyone, a moderator needs to ensure that only the allowed participants are part of this workspace.

Stage 2 includes one or more of the following configuration rules:

1. Upload files as external attachments to a file repository at e.g., https://files.companyname.com/case-number,
2. Attach and export a recording of the session in the virtual workspace e.g., as pointers and as MP4s, share any whiteboards e.g. as GIFs and Vector files, and
3. Export conversation transcripts as external case notes such that is it accessible by the customers.

With respect to the authorization rules at this stage, trusted business applications are allowed to access the virtual workspace, such as case management applications, logistics applications, and bug management applications.

Example 2: Internal Technical Support. This is a support use case and is a namespace for an internal virtual collaboration workspace in which the participants belong to one entity that is providing technical support.

Stage 1 includes one or more of the following configuration rules for creating this virtual collaboration workspace:

1. Create a workspace with a title prefix "Internal:"
2. Invite participants.
3. Post a welcome message.
4. Configure the workspace to monitor for file upload events.

Stage 1 further includes one or more of the following authorization rules:

1. Allow only internal users per domain identity (e.g., @companyname.com).
2. Allow only information-security approved internal bots.
3. Allow all users to be moderators.
4. Add per-user accounting.

Stage 2 includes the following configuration rules: 1) upload files as internal attachments to a file repository e.g. at https://files.company.com/support/casenumber and 2) export conversation transcripts as internal case notes. Stage 2 further includes the following authorization rules: allow trusted business applications such as case management applications, logistics application, bug management application, and escalation management application to access the internal virtual workspace.

Example 3: Vendors Technical Support. This is a support use case and is a namespace for another external virtual collaboration workspace in which the participants belong to a set of partner companies and are providing technical support.

Stage 1 includes the same configuration rules as in Example 2, described above. Stage 1, however, includes a different set of authorization rules. Specifically, the authorization rules include: 1) allow only internal users and users from specific partner companies, 2) allow only information-security approved internal bots, and 3) allow only internal users to be moderators. At Stage 2, the configuration and authorization rules are the same as in Example 2, described above.

Example 4: Patient Care—External. This is a use case for providing healthcare related customer relationship management (CRM) and is a namespace for another external virtual collaboration workspace in which participants include patients and healthcare providers.

Stage 1 includes one or more of the following configuration rules for creating this virtual collaboration workspace: 1) Create/Name workspace, 2) Invite participants, 3) Post a welcome message, visitor policy, and current visitor status, 4) Post patient vital signs such as pulse, blood pressure, and oxygen, 5) Post information about last three visits, 6) configure the virtual workspace to monitor for file upload events, and configure the workspace to accept uploads from wearables and/or medical devices related to the patient.

Stage 1 also includes an authorization rule that allows a patient, a patient advocate, and their authorized relatives and health care providers, to communicate about patient's condition in the workspace and to share patient related information.

Stage 2 includes one or more of the following configuration rules: 1) post changes to vital signs, 2) post visitor policy and current status, 3) post care team events (e.g., medications administered, meals consumed/not consumed, physical therapy taken), 4) post prescription reminders and pickup notifications, 5) post a request for patient transportation e.g., a link to a taxi application, 6) post requests for provider services (e.g., emergency call back; appointment scheduling; rehab and pharmacy referral), and 7) export conversation transcripts as external files and attach to a CRM case record.

Stage 2 further includes an authorization rule to allow the trusted business applications to access the virtual workspace and information-security approved bots to participate in the virtual workspace. The trusted business applications include: 1) an electronic health record (EHR) application, 2) a scheduling system application, 3) a hospital pharmacy management system application. The allowed bot applications include: 1) a patient transportation application bot (e.g., Uber Health Bot), 2) a pharmacy online bot, 3) hospital (provider) services bot, and 4) wearables with medical sensors.

Example 5: Patient Care—Internal. This is a use case for internally managing electronic health records (EHR) and is a namespace for another internal virtual collaboration workspace in which participants are health care providers.

Stage 1 includes one or more of the following configuration rules: 1) Create/Name workspace, 2) Invite participants, 3) Post a welcome message, 4) Post a patient chart (summary, initial diagnosis, and prognosis), and 5) Configure the workspace to monitor for file upload events.

Stage 1 also includes one or more of the following authorization rules: 1) allow health care providers to confer and collaborate during a care episode and 2) limit access to provider organization members and their guests.

Stage 2 includes one or more of the following configuration rules: 1) Post care team events (e.g., medications administered, meals consumed/not consumed, test results, prognosis), 2) Post diagnostic test results and images (e.g., MRI, Fetal Scan), 3) Post vitals and other readings from wearables or monitoring devices such as Intensive Care Unit monitor, 4) Post pharmacy issues (e.g., formulary), 5) Post requests for payment/coverage information to payer (insurance company), and 6) Export conversation transcript as internal files and attach to EHR patient record.

Stage 2 further includes an authorization rule to allow the trusted business applications to access the virtual workspace and information-security approved bots to participate in the virtual workspace. The trusted business applications include: 1) an electronic health record (EHR) application, 2) a scheduling system application, and 3) a hospital pharmacy management system application. The allowed bot applications include: 1) a hospital (provider) services bot and 2) insurer call center (payer) bot.

The techniques presented herein are not limited to examples above or to any particular namespace and these techniques are applicable to other virtual workspaces including manually created virtual workspaces.

Reference is now made to FIG. 1. FIG. 1 shows a system 100 that creates virtual workspaces of various types using namespaces. The system 100 includes a collaboration orchestrator 102, a primary business application (app) 104, one or more trusted business applications (apps) 106, a network 108, endpoints 110, a file repository 112, and a collaboration platform 114.

The collaboration orchestrator 102 is executed on one or more hardware servers. The collaboration orchestrator 102 applies the configuration and authorization rules defined for a given namespace throughout the lifecycle of the virtual workspace. That is, the namespace that defines the virtual workspace has rules that are managed and executed by the collaboration orchestrator 102, rather than in the collaboration platform 114. Access to the virtual space is managed at the configuration or namespace level.

The collaboration orchestrator 102 supports multiple tenants within an organization. Each tenant contains a group of trusted business applications 106 (uniquely identified using OAuth client identifier or a similar mechanism) and a list of namespaces. The virtual workspace is created in the context of a business object type (e.g. support case, sales opportunity, medical case). The trusted business applications 106 within a given tenant invoke repeatable tasks such as virtual workspace creation, participant addition and deletion of virtual workspaces in the context of a given business object by using application programing interfaces (APIs) and communicating with the collaboration workspace.

The primary business application 104 interacts with the collaboration orchestrator 102 through the APIs to create and embed secure collaboration virtual workspaces within the business workflows and to invoke repeatable tasks such as conversation transcript generation and export. For example, the primary business application 104 may be a support case management application with a business object type of "support case", defined by the namespace in the first example.

The trusted business applications 106 interact with the collaboration orchestrator 102 through the APIs to add participants (e.g., AddParticipants API), post messages, invoke repeatable tasks such as conversation transcript generation and export in the collaboration virtual workspace requested by the primary business application 104. The trusted business applications 106 may include a logistics application and/or a bug management application, defined by the namespace in the first example.

The endpoints 110 may take a variety of forms, such as desktop computers, laptop computers, tablets, mobile handheld devices (Smartphones), or dedicated video conference endpoint devices. The endpoints 110 may be configured with software to enable the endpoints 110 to participate in web-based video communications, chat or instant message applications, conferences or other dedicated communication sessions.

The endpoints 110 may include at least one video display, at least one video camera, one or more audio speakers (or headset) with a microphone, a processor (such as microprocessor) and memory that stores control software and a network interface that enables (wired and/or wireless) network communication. The control software may be configured to enable virtual workspace operations.

The file repository 112 includes one or more files that are stored in a file repository executed on one or more servers and may take a variety of forms. That is, files and/or other data shared in the collaboration workspace may be uploaded to the file repository. Additionally, files and/or other data to be shared are downloaded or exported into the collaboration workspace.

The collaboration platform 114 is a virtual workspace server entity or entities that creates the virtual workspaces based on instructions received via a Representational State Transfer (REST) API from the collaboration orchestrator 102. The collaboration platform 114 may be implemented in a cloud and communicates with the collaboration orchestrator 102 and endpoints 110 via the network 108 such as the internet.

In the example depicted in FIG. 1, the collaboration orchestrator 102 creates a virtual workspace of the namespace type "Tech Support—Customer" (first example explained above) in the context of a support case business object type to facilitate collaboration within the support workflow.

Specifically, at 120, the primary business application 104 invokes CreateSpace API request to create a virtual workspace of namespace type "Tech Support—Customer" in the context of a case with a business object identifier (ID) 61234567 in response to the case being accepted by an engineer. The CreateSpace includes a list of initial participants to be added to the virtual workspace. Based on the information in the CreateSpace, the collaboration orchestrator 102 choreographs user interactions with different collaboration and communications platforms. The techniques take on a deterministic approach, by capturing trigger events in various business applications involved to drive the behavior of the virtual workspace through a service orchestration.

The collaboration orchestrator 102 processes the CreateSpace API and executes a series of sub-tasks as defined within the namespace and then returns the result in an API response to the primary business application 104. For example, the collaboration orchestrator 102 checks whether the primary business application 104 (i.e., the client application) is authorized to create a virtual workspace in the context of the given business object type and checks whether the participants listed in the CreateSpace are authorized to participate in this virtual workspace based on the configuration and authorization rules defined in the namespace "Tech Support—Customer".

If the authorizations are successful, at 122, the collaboration orchestrator 102 communicates with the collaboration platform 114 to create a virtual workspace and to subscribe to file notifications and membership event notifications from the collaboration platform 114. The collaboration orchestrator 102 adds participants and subscribes for file notifications.

At 124, the collaboration orchestrator 102 communicates with the users using the endpoints 110 that have been authorized to participate in the virtual workspace and posts a welcome message and provides files.

At 126, the collaboration orchestrator 102 automatically moves files shared within the virtual workspace to the file repository 112 and subscribes for webhook notifications for file upload events.

At 128, the collaboration orchestrator 102 processes the AddParticipants API (/AddParticipants) request from trusted business applications 106 and adds the authorized participants to the collaboration workspace. Trusted business applications 106 use the AddParticipants API to add additional team members based on the workflow need.

After the virtual workspace is created, authorized participants collaborate by sending messages, sharing files that are relevant to the business workflow. The collaboration orchestrator 102 is notified of file upload events. The collaboration orchestrator 102 processes file upload events by downloading the corresponding file from the collaboration platform and uploading the file to a target file repository system as defined in the "Tech Support—Customer" namespace, i.e. the file repository 112. The collaboration orchestrator 102 is also notified of new members being added by the moderators within the virtual workspace, ensures that these members are authorized to participate in the virtual workspace, and automatically removes the newly added members if they do not have the security access level required for the virtual workspace.

The techniques presented above provide the ability to share the virtual workspace among the primary business application 104 and the trusted business applications 106. As the business workflow progresses, several events happen and additional team members e.g., experts could be added by the primary business application 104 and/or the trusted business applications 106 to accelerate the business outcome. For example, if an RMA is attached to a case, the logistics application can automatically add a logistics agent processing the RMA order into the external "Tech Support—Customer" virtual workspace. If a high severity bug is attached to a case and the bug is yet to be resolved, experts from the support team or the engineering team can be automatically added by the bug management application to accelerate the resolution of the bug.

The primary business application 104 and/or the trusted business applications 106 could also add bots to the virtual workspace in order to augment troubleshooting, facilitate automated data collection, and to provide relevant contextual notifications. The collaboration orchestrator 102 checks whether these bots are authorized to participate in the virtual workspace and then adds them if authorized.

When the business outcome is accomplished, for example, the support issue is resolved and the case is closed, the primary business application 104 invokes DeleteSpace API (/DeleteSpace) to delete the virtual workspace, as now described with reference to FIG. 2.

Figure 2:
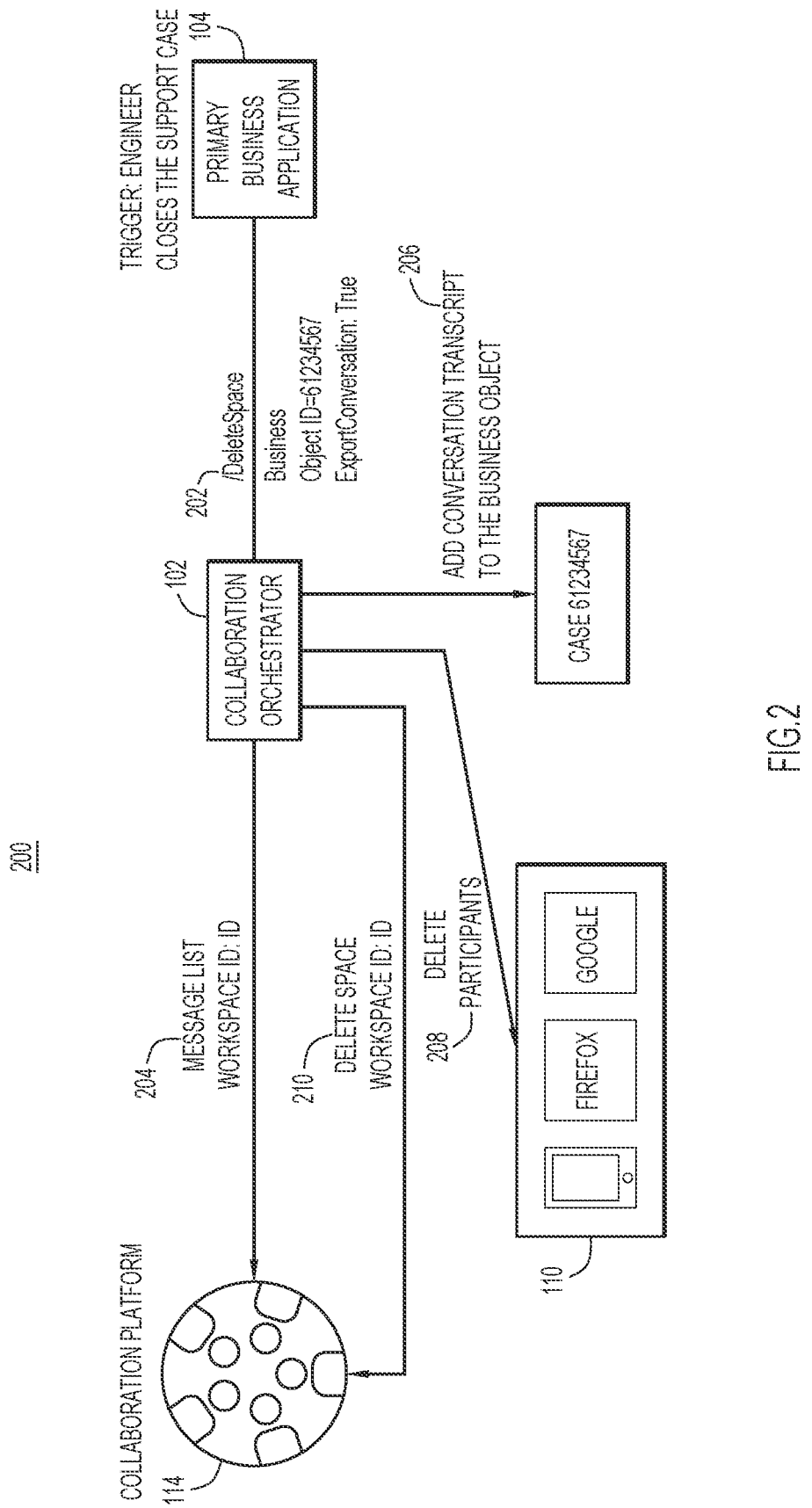
FIG. 2 is a high-level functional block diagram of a system configured to delete virtual workspaces, according to an example embodiment.

In FIG. 2, a system 200 includes the collaboration orchestrator 102, the primary business application 104, the endpoints 110, and the collaboration platform 114 described with reference to FIG. 1.

The primary business application 104 (e.g., the case management application) obtains a triggering event (a trigger). For example, the engineer closed the support case with a business object identifier (ID) "61234567". At 202, the primary business application 104 invokes the API (/DeleteSpace) to delete one or more virtual workspaces associated with the business object ID "61234567". The request to delete the one or more virtual workspace may further include other parameters (e.g., export conversation flag (true or false)).

The collaboration orchestrator 102 processes the received request to delete the one or more virtual workspaces associated with the business object ID "61234567" based on a series of configuration rules defined in the virtual space's namespace and then returns the result to the primary business application 104.

Specifically, the collaboration orchestrator 102 checks whether one or more virtual workspaces exist that are associated with the business object ID provided in the request. That is, the collaboration orchestrator 102 identifies one or more virtual workspaces associated with the business object ID and generates a list of one or more virtual workspaces that are associated with the business object ID.

Based on the workspace IDs in the list, at 204, the collaboration orchestrator 102 communicates with the collaboration platform 114 to check whether or not these virtual workspaces exist. The collaboration platform 114 provides a response indicating whether each of the virtual workspaces corresponding to the workspace IDs are found. If none of the virtual workspaces are found, the collaboration orchestrator 102 returns an error to the primary business application 104. On the other hand, if one or more virtual workspaces are found, the collaboration orchestrator 102 retrieves the corresponding configuration and authorization rules defined in the respective namespaces. The collaboration orchestrator 102 then checks whether the primary business application 104 is authorized to the delete the virtual workspaces based on the configuration and authorization rules. If the primary business application 104 is not authorized to delete one or more of the virtual workspaces, an error message is provided to the primary business application 104 for the respective virtual workspaces.

If the primary business application 104 is authorized to delete the one or more of the virtual workspaces, at 206, the collaboration orchestrator 102 retrieves the list of messages exchanged between the user and bot participants in each virtual workspace and exports the conversation transcript in the prescribed format to a target destination based on the parameters in the request (ExportConversation: True) and/or based on the configuration and authorization rules. The target destination and the transcript format are specified within the namespace. The collaboration orchestrator 102 ensures that all files shared within the virtual workspace to be deleted are successfully transferred to a respective file repository system (e.g., the file repository 112 in FIG. 1) and are stored under the respective business object ID—"61234567".

At 208, the collaboration orchestrator 102 removes all participants of the virtual workspace being deleted. The participants may include one or more users that use the endpoints 110 and one or more bot participants.

At 210, the collaboration orchestrator 102 communicates with the collaboration platform 114 to delete the one or more virtual workspaces associated with the business object ID by providing the workspace ID for each virtual workspace to be deleted. Based on the delete request, the collaboration platform 114 deletes the virtual workspace.

The techniques presented above use namespaces to manage entire lifecycle of secure collaboration virtual workspaces created in the context of business workflows. Namespaces define a set of configuration rules, a set of authorization rules, a moderation and conversation monitoring method, and the records retention process to be used for managing collaboration virtual workspaces. Trusted applications invoke the collaboration orchestrator 102 via the API to create virtual workspaces of various given namespace types, invoke repeatable tasks, and delete the virtual workspaces. The collaboration orchestrator 102 retrieves the definition of the namespace associated with the virtual workspace and executes the configuration rules, enforces participant authorization rules, transfers files shared within the virtual workspace to various file repositories for long-term retention as defined within the namespace. Accordingly, multiple collaboration sessions associated with one or more business objects are securely managed and shared by various software applications within an enterprise or even across enterprises.

In the virtual workspaces, end user participants expect the ability to interact with one or more bots in a multi-user workspace so that they can discuss a support or other ticket collaboratively among all members who are working on an issue. For example, a customer would be interested to discuss a "routing loop issue" in a virtual space consisting of colleagues from the same customer company, partners who implemented the network, and support engineers from the vendor of the network equipment. The permission level of each of these user roles may vary. A colleague can only see cases of his/her company, a partner can view tickets that belongs to multiple customers managed by the partner company, and vendor's support engineer can view tickets of all customers.

The bot cannot simply be added in a multi-user collaboration workspace and respond to any queries from any participant because it could lead to exposing the ticket data to someone who is not authorized to view the ticket data. For example, a partner accidently asks the bot about the status of a ticket that belongs to company B in a virtual workspace that has participants from company A. The bot will check the partner's permission level, determine that the partner can view company B data, and send the response in a multi-user workspace. Now, all participants from company A can see company B's ticket details. Such data leaks need to be avoided.

The solutions presented herein, in a form of a system and a method, enable bot interaction in multi-user workspaces while adhering to customer data protection requirements. The solutions involve creating a context-aware, conversational chat bot or agent in multi-party conversations where participants have different levels of security access to information. The bot operates in one or more modes, from a restricted mode with a reduced set of skill to an unrestricted mode with all skills enabled depending on the business context of the multi-user collaboration virtual workspace.

Context may be established by a separate orchestration service component that associates the collaboration session (e.g., a virtual workspace, such as a WebEx® Teams Space) with participant security roles (guest, customer, employee), their organizations, and different business objects (e.g., case, RMA #, bug identifier (ID)) maintained in external business systems.

These associations create a social graph of relationships that can be used by the chat bot's dialog rules to filter content used in responding to questions in a multi-party chat or respond by privately messaging a user with "need to know" privileges without exposing privileged content in the multi-party conversation. This enhancement to dialog management enables the bot (chatbot) to behave conversationally, with the natural discretion exercised by human participants.

Figure 3:
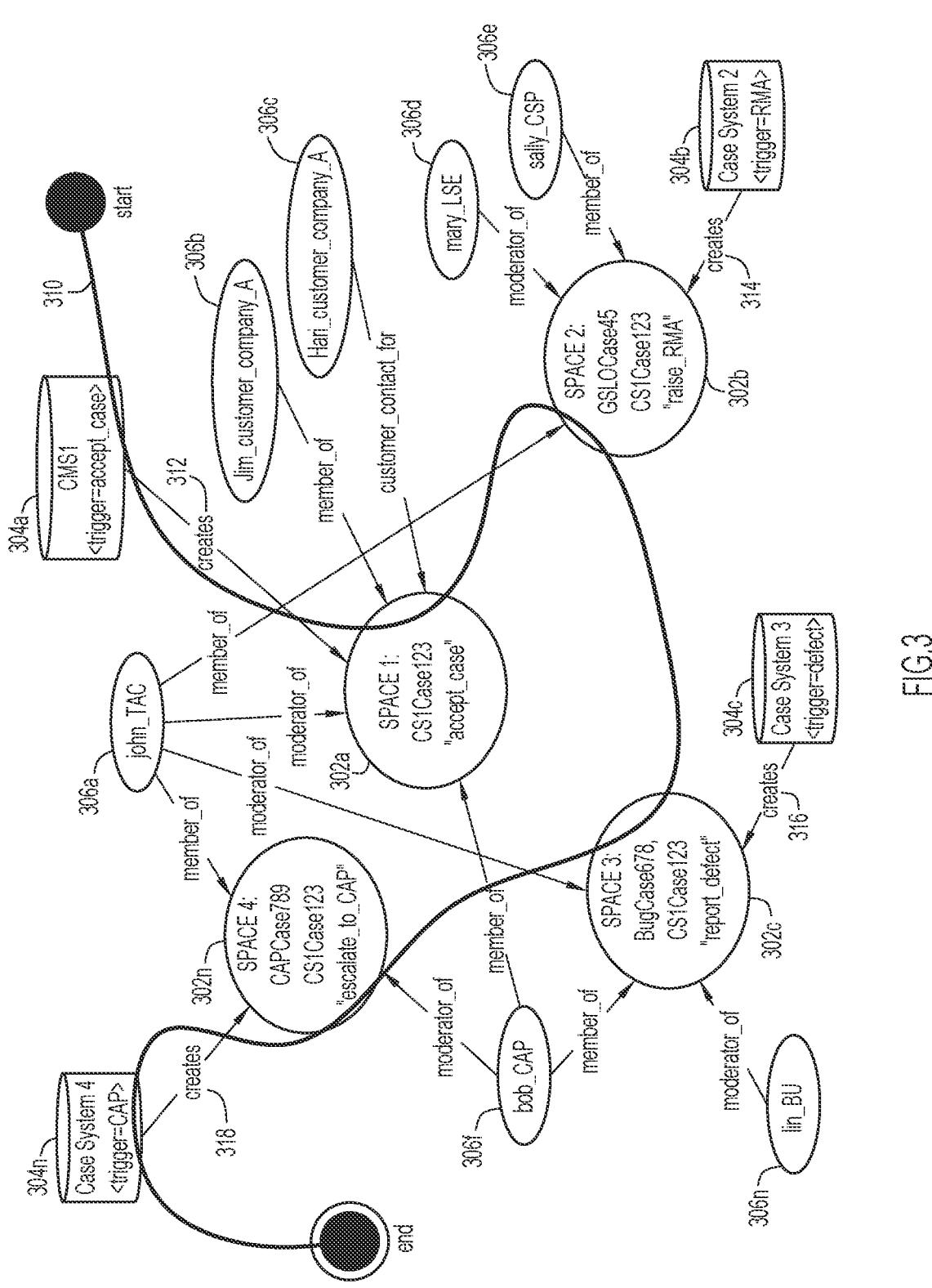
FIG. 3 is a diagram depicting representation of business context in multi-user collaboration spaces or virtual workspaces, according to an example embodiment.

Turning now to FIG. 3, a diagram 300 depicts a representation of business context in multi-party collaboration workspaces. The business context could be a support engagement identified by a ticket number, engineering engagement identified by an escalation ticket number or a bug number, logistics engagement identified by a RMA. The collaboration workspaces 302a-n are generated to solve a customer's problem. Each of the collaboration workspaces 302a-n is generated in its own business context by one of the case systems 304a-n and includes one or more of participants 306a-n that are working on the problem but are inter-related to one other based on the initial business context. One of ordinary skill in the art would readily appreciate that the number of workspaces, participants, and case systems involved may vary based on a particular implementation or configuration and based on a use case scenario.

In the example of FIG. 3, at 310, a customer initially raises a case with a technical support ("TAC"). The case management system (CSM 1) 304a accepts the case. At 312, a first workspace 302a ("space 1") is generated based on the CSM1 304a accepting the case. The first workspace 302a is created in the business context of "CS1Case123" or support ticket number "123" and is generated in response to a case being accepted "accept_case" event.

A first set of participants is assigned to the first workspace 302a and includes participants 306a-c. The first participant 306a ("john_TAC") is the technical support agent that accepted the case and is a moderator of the first workspace 302a. The second participant 306b ("Jim_Customer_Company_A") is a member who belongs to the customer company for which this case is opened. The third participant 306c ("Hari_Customer_Company_A") is the primary customer point of contact for this case and is a member of the first workspace 302a. A moderator of a workspace may add or delete participants in the workspace, whereas members may only post and obtain data from the workspace. Since the participants 306a-c belong to the customer and vendor companies, the first workspace 302a is an external workspace type.

In helping to solve the customer's case, various other systems may need to be involved e.g., the case systems 304b-n. Additionally, various additional workspaces may need to be generated e.g., the workspace 302b-n. Since these workspaces 302b-n include participants from the same vendor company, they are of an internal workspace type.

For example, an order needs to be sent out to replace a defective product. As such, when an engineer ticks a box requiring a product return, this serves as a triggering event e.g., "raise RMA". In response to this triggering event, at 314, the second case system 304b (e.g., Logistics Support—Case System 2) creates the second workspace 302b ("Space 2") in the business context of logistics engagement identified as "GSLOCase 45". The second workspace 302b is associated with the initial case and is related to the business context "CS1Case123" or the same support ticket number "123". A second set of participants that overlaps with the first set of participants is assigned to the second workspace 302b. The second set of participants includes the first participant 306a who is now a member, the fourth participant 306d ("mary_LSE") who is a moderator and is assisted by the fifth participant 306e ("sally_CSP").

At 316, the third case system 304c (e.g., engineering system) creates a third workspace 302c ("Space 3") in a business context of software defect "BugCase678". That is, a software defect is discovered in the product and the third workspace 302c is created to track the resolution of this software defect. The third workspace 302c is associated with the initial case, related to the business context of "CS1Case123" or the same support ticket number "123". As a result, it is also linked with the first workspace 302a and second workspace 302b. A third set of participants is added to the third workspace 302c. Specifically, the first participant 306a and the seventh participant 306n ("lin_BU") are both moderators and the sixth participant 306f ("bob CAP") is an assisting member.

At 318, a fourth case system 304n creates a fourth workspace 302n ("Space 4"). For example, the case is taking too long to resolve (more than a predetermined time threshold) or longer than specified in a service level agreement (SLA). This servers as a triggering event—"escalate to CAP" for the fourth case system 304n (Customer Assurance Program (CAP) system) to generate the fourth workspace 302n to expedite the resolution of the case. While the fourth workspace 302n is assigned a business context "CAPCase 789", it is also associated with the business context of "CS1Case123" or the same support ticket number "123" and as such is linked to the other workspaces 302a-c. The fourth workspace 302n includes a fourth set of participants such as the first participant 306a as a member and the sixth participant 306f as a moderator.

While the business context in FIG. 3 relates to the technical support domain, other domains are within the scope of example embodiments. Other domains may include a sales engagement identified by an opportunity ID number and/or a health care engagement identified by appointment ID. In the case of health care domain, the virtual workspaces 302a-n may include a family workspace for family and friends participants, a provider workspace for doctors, pharmacists, social workers participants, and a support workspace for nurses, medical suppliers, food suppliers participants. The patient may be a business context that links these various workspaces 302a-n to one another.

From a customer's point of view, this is one case or one patient, but to solve the case or manage a patient, various workspaces 302a-n are generated and various case systems 304a-n are involved. The collaboration orchestrator 102 manages these workspaces 302a-n, their associations, and their participants 306a-n. Additionally, the collaboration orchestrator 102 manages the roles of the participants 306a-n in each of the workspaces 302a-n and manages metadata related to these workspaces 302a-n. The metadata includes a state of a workspace (live/active or deleted/inactive). The metadata also includes links to artifacts or data captured while the workspace is active and/or to one or more records in various file repositories when the workspace is deleted or no longer active.

To adhere to data restriction requirements, bots in the multi-user collaboration workspaces need to be context aware and participants aware. The bots need to operate with a varied skill set level depending on the participants in the workspace. For example, during a restricted mode, the bot allows only conversational requests that are related to the specific business objects (ticket number, sales opportunity identifier, health check appointment identifier) associated with the multi-user collaboration workspace. This solves the data exposure problem and at the same time enables the usage of the bot in multi-user collaboration workspaces.

Figure 4:
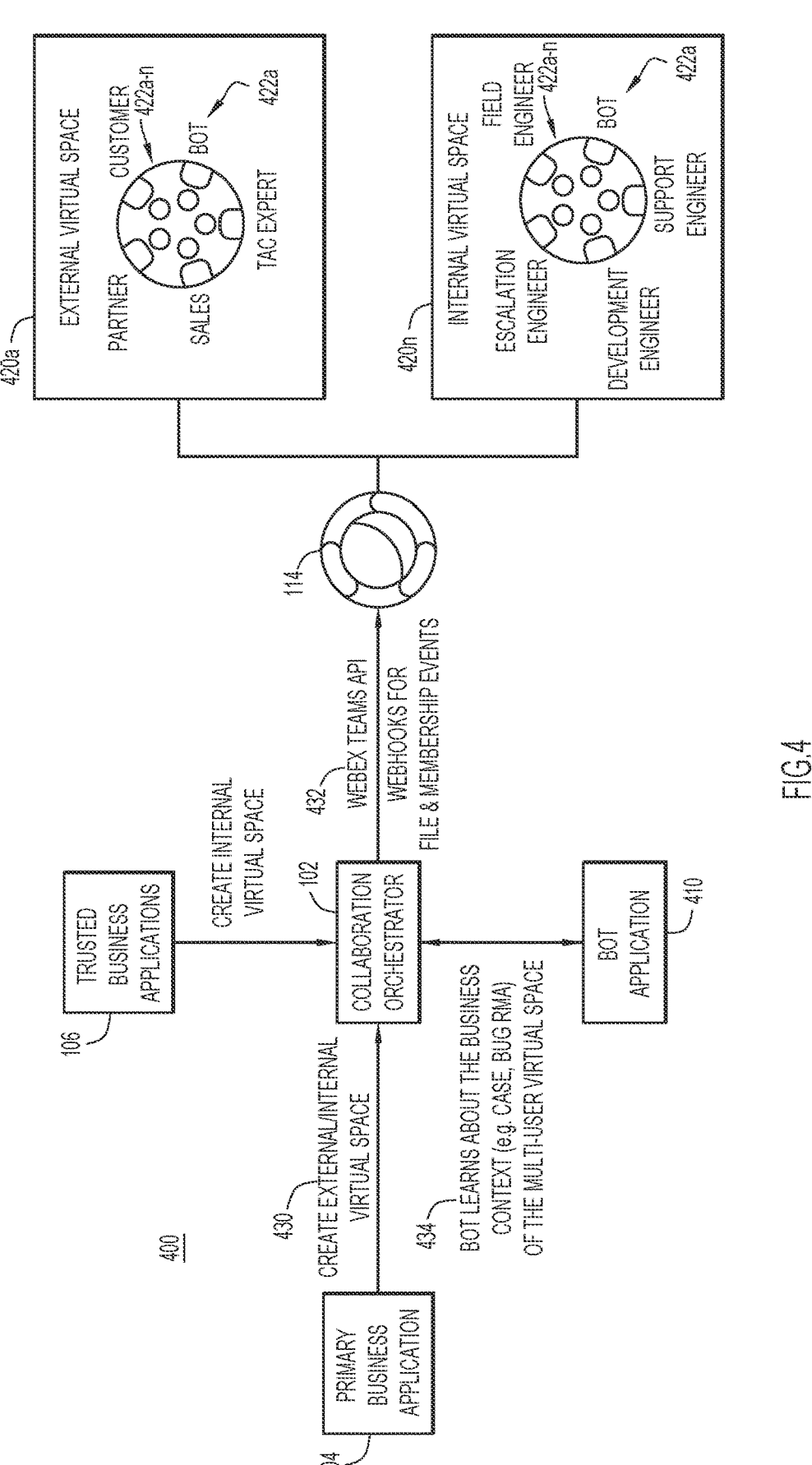
FIG. 4 is a high-level functional block diagram depicting bot participation in multi-user external or internal collaboration spaces or virtual workspaces, according to an example embodiment.

Reference is now made to FIG. 4. FIG. 4 shows a system 400 that supports bot participation in multi-user external and internal collaboration workspaces 420a-420n. The system 400 includes the collaboration orchestrator 102, the primary business application 104, the trusted business applications 106, and the collaboration platform 114, described with reference to FIGS. 1 and 2. The system 400 further includes a bot application 410 and virtual workspaces 420a-n such as an external virtual workspace 420a and internal virtual workspace 420n with various participants 422a-n. The participants 422a-n are similar to the participants 306a-n in FIG. 3. The participants 422a-n include a bot 422a. Different bots may be deployed in various virtual workspaces and the bot 422a is simply one example.

At 430, the primary business application 104 such as case management, sales management, health care management, etc., request that a virtual workspace 420a be created in the context of a business engagement and requests that the bot 422a is added as a participant. The primary business application 104 sends the request to the collaboration orchestrator 102.

At 432, the collaboration orchestrator 102 interacts with the collaboration platform 114 to create and monitor one or more workspaces 420a-n to ensure that only authorized participants are allowed depending on the respective virtual workspace type, as shown in FIG. 3. The collaboration orchestrator 102 creates the workspace as explained with reference to FIG. 1.

At 434, the bot application 410 becomes aware that it is added to a collaboration workspace (e.g., one or more of the workspaces 420a-n) and sets a skill set for the bot 422a based on a business context of the workspace. Specifically, the bot application 410 becomes aware that it has been added to a collaboration workspace (e.g. through a membership based webhook). The bot application 410 queries the collaboration orchestrator 102 to understand the business context in which the collaboration workspace is used. This can be accomplished through the API that takes a workspace ID as input and returns the collaboration workspace type (internal, external), business object type (ticket, sales opportunity, health appointment), and business object value (ticket number, opportunity ID, appointment ID). As explained above, workspaces of the type "internal" allow only employees of a company as participants whereas workspaces of the type "external" allow authorized external users such as customers, partners of a company, and so on as participants.

According to an example embodiment, after the creation of the collaboration workspace, the bot 422a continues to learn about additional new business context by querying the collaboration orchestrator 102 periodically, or at specific triggering events such as an addition of a new participant. The bot 422a may also subscribe for business context change events. According to one example embodiment in which an enterprise deploys the bot 422a without the use of collaboration orchestrator 102, the enterprise informs the bot 422a about the business context by invoking a bot API interface to pass the same information provided at 434.

Figure 5:
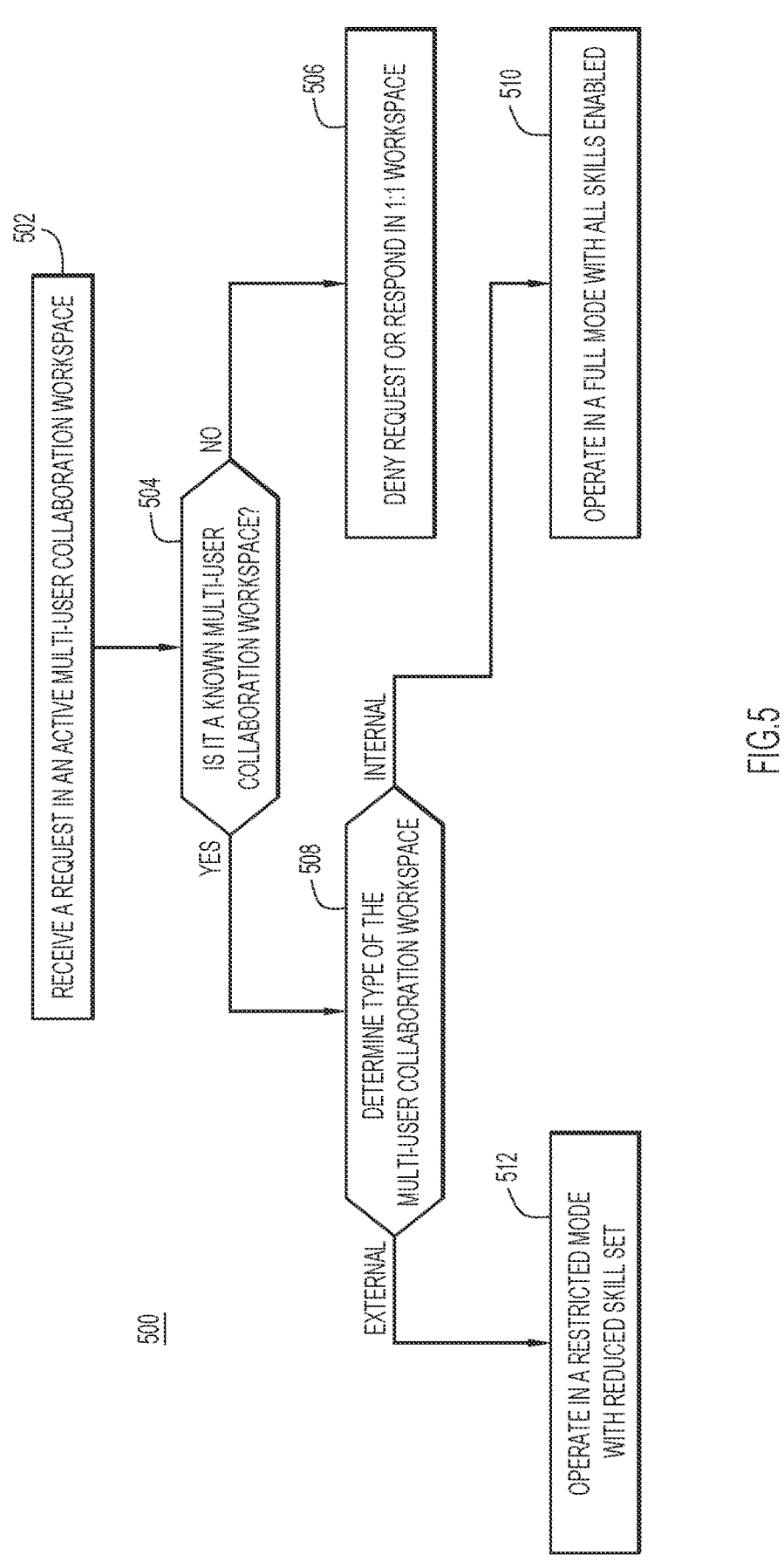
FIG. 5 is a flowchart illustrating a method of a bot interacting in a multi-user collaboration workspace, according to an example embodiment.

FIG. 5 is a flowchart illustrating a method 500 in which the bot 422a interacts in a multi-user collaboration workspace, according to an example embodiment. The method 500 is implemented by the bot application 410 that configures the bot 422a for an active multi-user collaboration workspace based on the context of the workspace.

At 502, the bot 422a receives a request in an active multi-user workspace. The request is from one of the participants 422b-n and may include a status inquiry or a request for the bot 422a to perform a particular task.

At 504, the bot 422a checks whether it is a known multi-user collaboration workspace. For example, the bot 422a may be manually added by a user to a multi-user collaboration workspace. In this case, the collaboration workspace is unknown and at 506, the bot 422a denies the request or responds in a 1:1 workspace if the requestor is authorized to receive the response.

If the bot 422a is added by the primary business application 104, the multi-user collaboration workspace is a known workspace and the workspace type, business object type and value associated with the collaboration workspace are obtained from the collaboration orchestrator 102. In this case, at 508, the bot 422a determines the type of the virtual workspace. If it is a known collaboration workspace and the virtual workspace type is "internal", at 510, the bot 422a operates in a full mode. The bot 422a provides a response with the requested details since all internal users are authorized to use all the functionalities of the bot 422a and to obtain all details associated with the case. The bot 422a is fully enabled with all available skills.

If it is a known collaboration workspace and the virtual workspace type is "external", at 512, the bot 422a operates in a restricted mode with a reduced skill set. The bot 422a checks whether the user's request is related to the business object type and value associated with this workspace and whether the request type is generally available for all participants of the workspace (e.g. status requests). The bot 422a provides a response with the requested details if these conditions are satisfied. Otherwise, the bot blocks the request and provides a permission error response or responds in a 1:1 space depending on the requestor's authorization level.

According to the techniques described in FIGS. 4 and 5, the bot 422a operates in different modes with different skill sets in different collaboration workspaces using the same bot identity depending on the business context of the workspaces.

For example, a case management business application creates an "external" collaboration workspace in the context of a business engagement and adds the bot 422a as a participant. The bot application 410 becomes aware that it has been added to a collaboration workspace and uses the collaboration orchestrator API to understand the business context in which the collaboration workspace is used. The bot application 410 passes the workspace ID as an API input to the collaboration orchestrator 102 and receives, in response, the workspace type (e.g., external), the business object type (e.g., case), and the business object value (e.g., case number). Based on this response, the bot application

410 configures the bot 422a to operate in a restricted mode within the context of the support case.

Accordingly, when a request is received by the bot 422a in this multi-user collaboration workspace, the bot 422a determines that it is an "external" virtual workspace and retrieves the case number (business object) associated with the collaboration workspace. The bot 422a then allows user requests if the requests are related to the business object value (e.g., case number) and if the requests are generally available for all participants in the workspace (e.g. case status requests).

As another example, a bug management business application creates an "internal" collaboration workspace in the context of collaborating with engineering to resolve a customer found bug and adds the bot 422a as a participant. The bot application 410 becomes aware that it has been added to the collaboration workspace. The bot application 410 uses the collaboration orchestrator API to understand the business context in which the multi-user collaboration workspace is used. It passes the workspace ID as the API input to the collaboration orchestrator 102 and in response, receives the workspace type (e.g., internal), the business object type (e.g., bug), and the business object value (e.g., bug id). The bot application 410 configures the bot 422a to operate in a full mode with all skills enabled within the context of the bug.

Accordingly, when a request is received by the bot 422a in the multi-user collaboration workspace, the bot 422a determines that it is an "internal" virtual workspace and retrieves the business object value (bug number or id) associated with the virtual workspace. The bot 422a allows participants to leverage the full set of features since it is operating in a full mode. A participant can lookup statuses of cases associated with the bug, add notes to the bug, add internal notes to the case, and so on.

The systems and methods presented herein provide for capabilities not heretofore known, including, without limitation, context aware bots that operate in a multi-user collaboration workspaces. According to various example embodiments, the bots dynamically change the list of intents (skill set) made available to the user (participant) depending on the operational mode, the bots dynamically restrict the list of business objects that can be queried and managed based on the business context of the collaboration space. The bots continuously learn about the business context by subscribing to business context change events, by looking up the latest business context when specific trigger events such as a new participant is added or removed to the collaboration workspace, or by simply querying the collaboration orchestrator 102 periodically. The bot application 410 provides an API interface for authorized business applications to inform the bots about the business context. According to one deployment, this API interface is used to communicate between the business applications and the bot application 410 when the collaboration orchestrator 102 is omitted.

The systems and methods presented herein provide a bot functionality that enables the bots to be context aware and dynamically change their respective operational modes (full mode versus various different restricted modes) and adjust their respective skill sets based on the business context of the collaboration workspaces to which they are invited. This paves the way for the use of bots in multi-user collaboration workspaces containing participants from multiple companies and with different authorization levels to access business data. Thus, a conversational chatbot provides multi-party conversations where participants have different levels of security access to information. The bots operate in one or more modes, from a restricted mode with a reduced set of skill to an unrestricted mode with all skills enabled depending on the business context of the multi-user collaboration virtual workspace.

The systems and methods presented herein are not limited to any particular type of virtual workspace technology, and thus may be used in conjunction with any such virtual workspace technology now known or hereinafter developed. The virtual "room", regardless of the particular type of underlying virtual workspace technology, is used to orchestrate the flow of a case through a virtual workspace or room. These concepts could be extended for sales cycle operations, where the state of the event (case, lead, etc.) is directed to virtual workspaces/rooms with different populations. The virtual workspaces/rooms may be dynamically generated by bots with users participants added thereafter.

Figure 6:
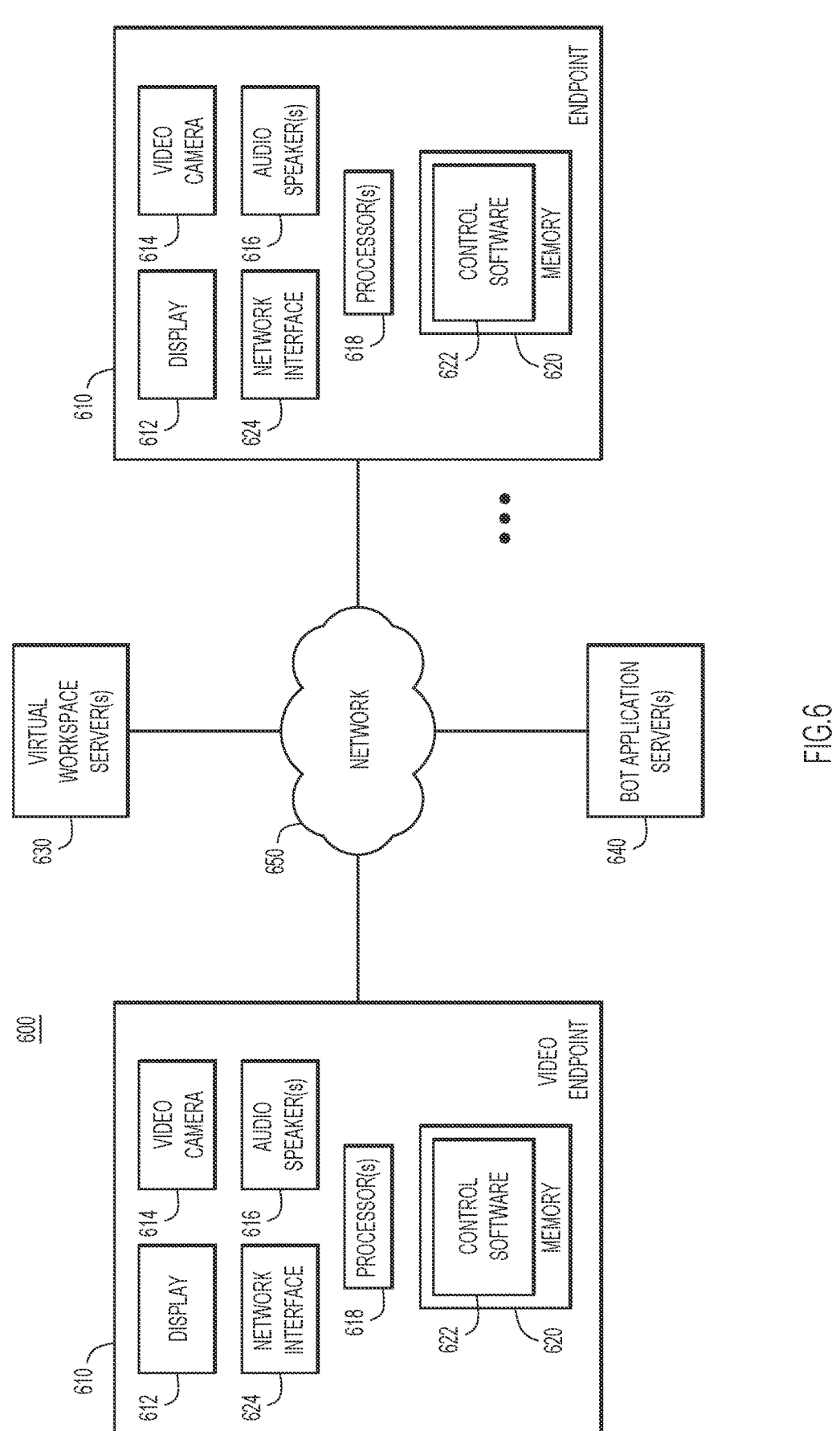
FIG. 6 is a block diagram of a system that may be configured to support the bot participation in multi-user external or internal collaboration spaces or virtual workspaces of FIGS. 3 and 5, according to an example embodiment.

FIG. 6 illustrates a block diagram of an implementation of a system 600 in which the techniques presented above may be used. The system 600 includes two or more endpoints 610 used by virtual workspace participants, a virtual workspace/collaboration platform server(s) 630, a bot application server(s) 640, and a network 650 over which the endpoints 610, the virtual workspace server(s) 630, and the bot application server(s) 640 communicate with each other.

The endpoints 610 may take a variety of forms, such as desktop computers, laptop computers, tablets, mobile hand-held devices (Smartphones), or dedicated video conference endpoint devices. The endpoints 610 may be configured with software to enable the endpoints 610 to participate in web-based video communications, chat or instant message applications, conferences or other dedicated communication sessions.

The endpoints 610 may include at least one video display 612, at least one video camera 614, one or more audio speakers 616 (or headset) with a microphone, a processor 618 (such as microprocessor), a memory 620 that stores control software 622, and a network interface 624 that enables (wired and/or wireless) network communication. The control software 622 may be configured to enable virtual workspace operations.

The bot application server(s) 640 performs the operations of the bot application 410 shown in FIG. 4. It should be understood that in some implementations, the functions of the bot application server(s) 640 may be performed by the virtual workspace server(s) 630.

Figure 7A:
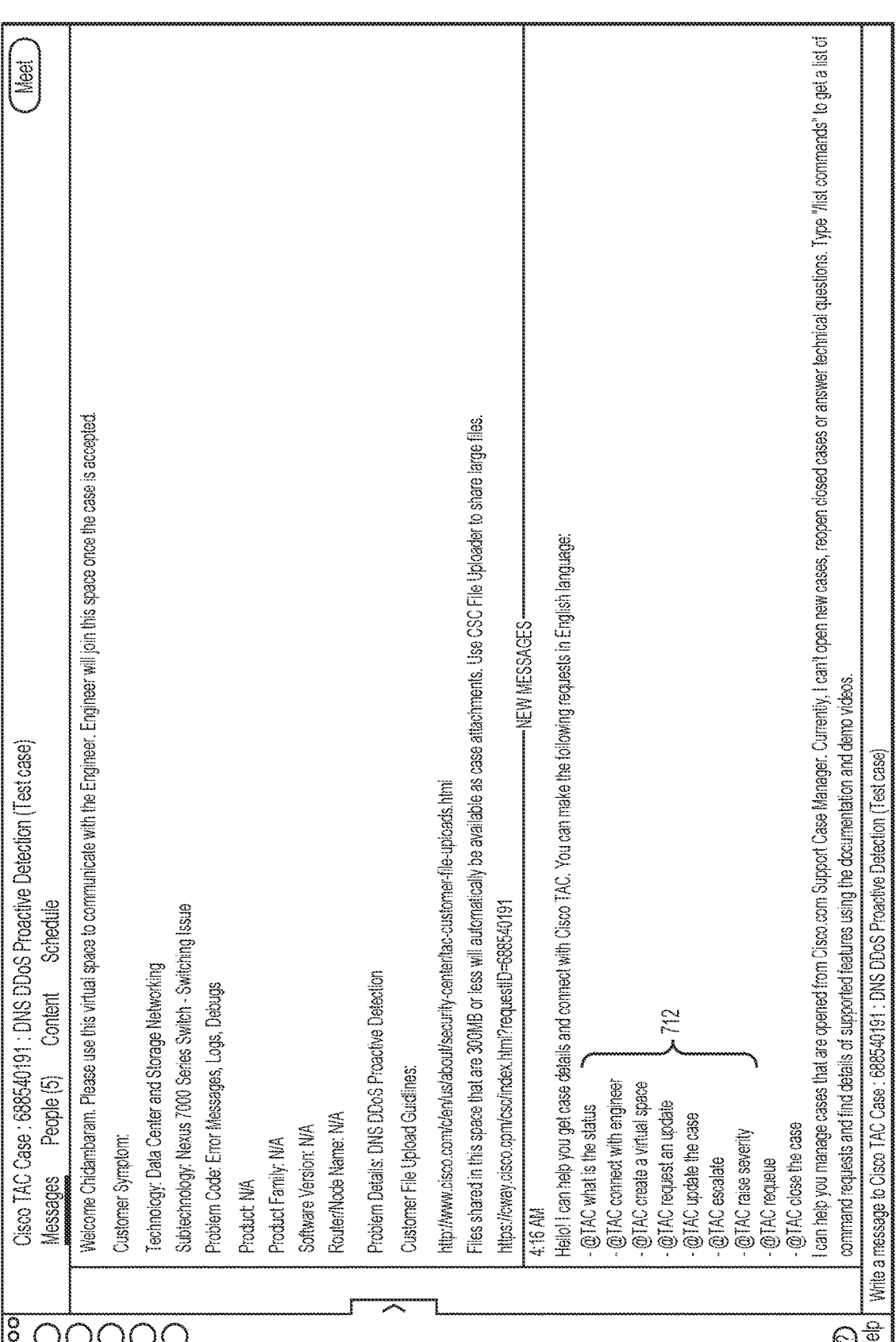
FIG. 7A is a screen shot of an example user interface screen showing a situation where the bot interacts with an external multi-party virtual collaboration space, according to an example embodiment.
Figure 7B:
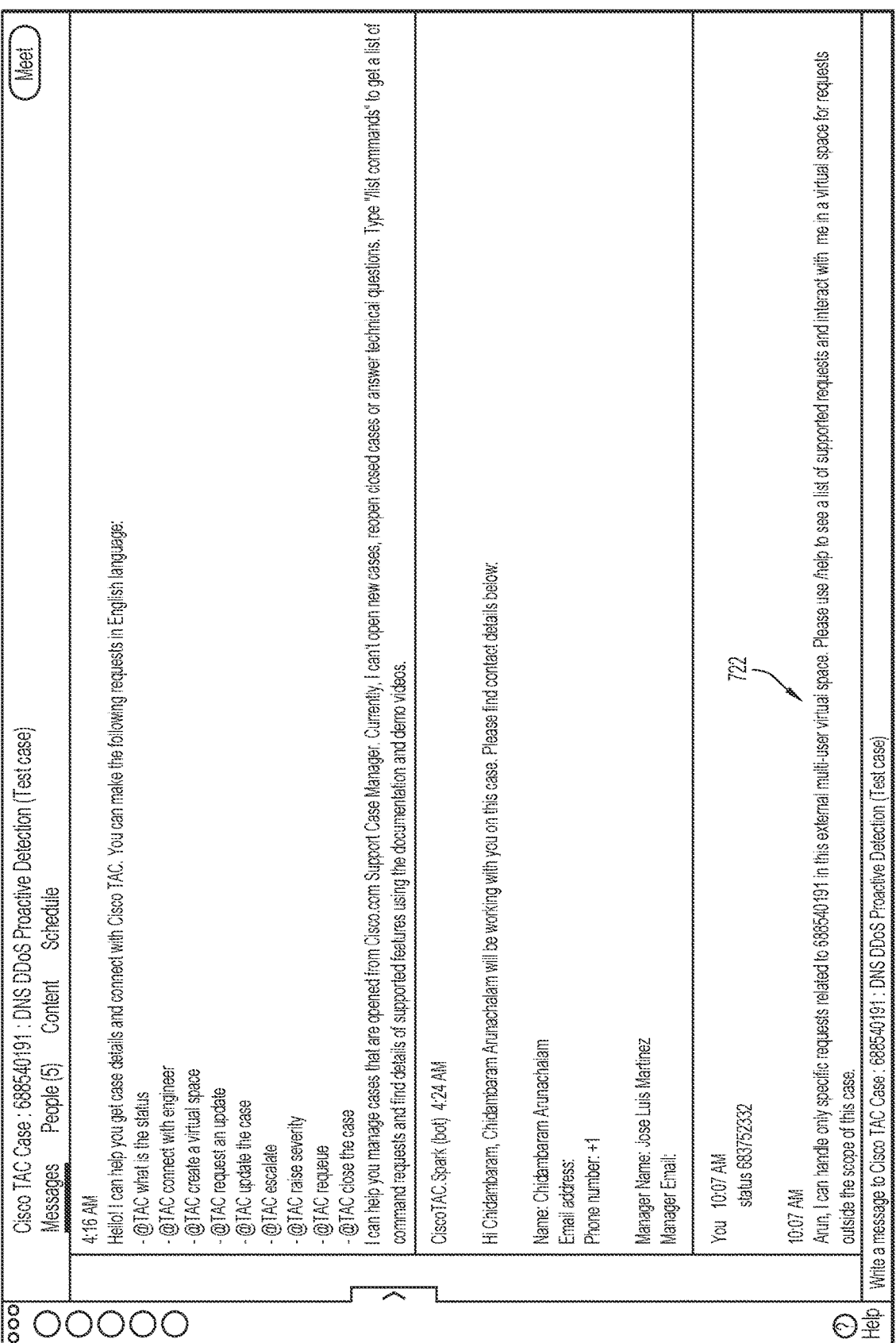
FIG. 7B is a screen shot of an example user interface screen showing a situation in which the bot blocks a request that is related to one support case which is different than another support case, according to an example embodiment.
Figure 7C:
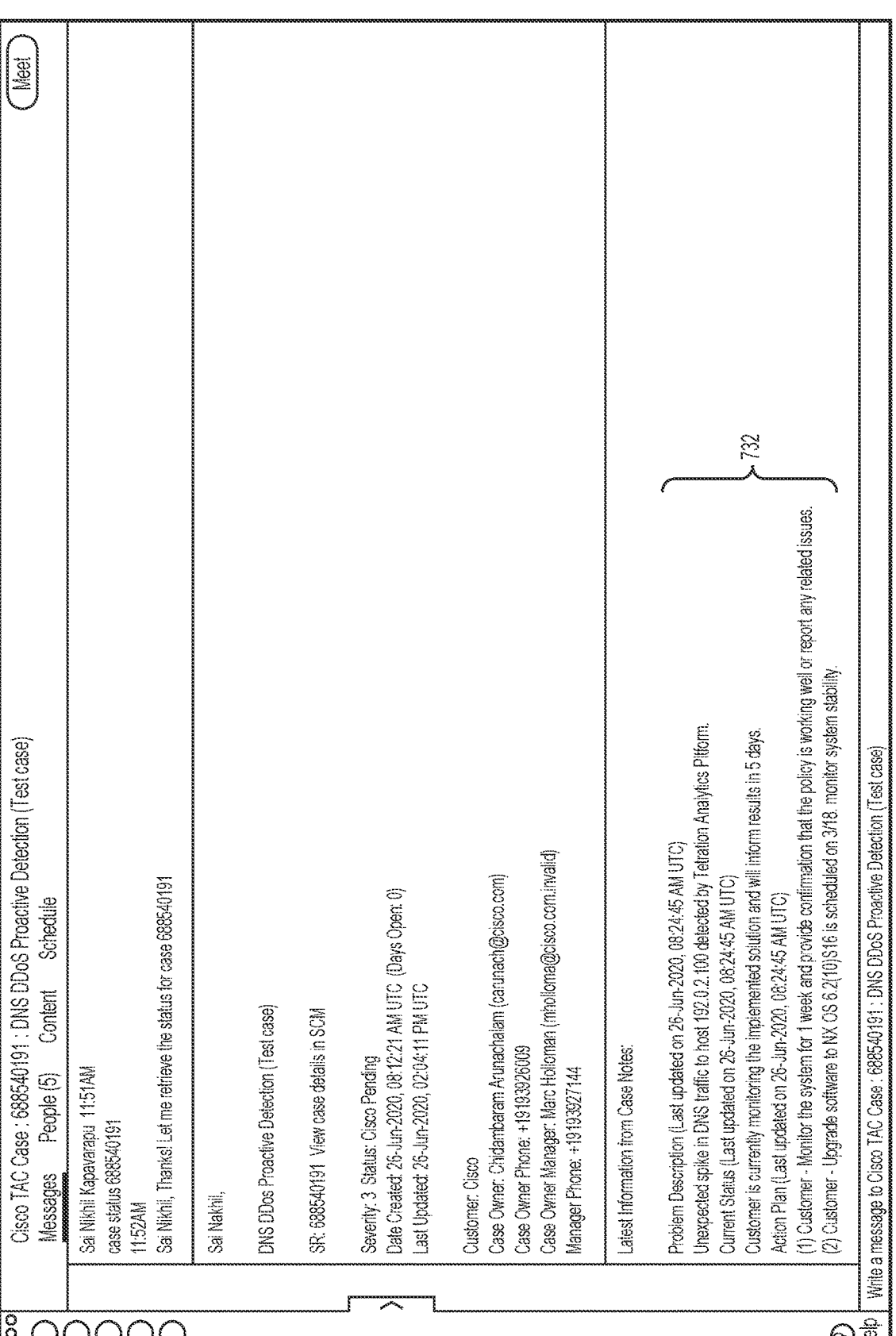
FIG. 7C is a screen shot of an example user interface screen showing a situation in which the bot responds to a status request that is related to a support case in an external virtual workspace, according to an example embodiment.

Turning now to FIGS. 7A-7C, example user interface screens are shown that illustrate operations of the system and method presented herein, according to an example embodiment.

FIG. 7A shows a first user interface screen 710 in which the bot interacts with an external multi-party virtual collaboration workspace created in the context of a support case 688540191. In the first user interface screen 710, the limited or reduced skill set of the bot is listed at 712.

FIG. 7B shows a second user interface screen 720 in which the bot blocks a request that is related to a support case 683752332 which is different than the support case 688540191 (business object associated with the external workspace). In the second user interface screen 720, the error message 722 is displayed.

FIG. 7C illustrates a third user interface screen 730 in which the bot responds to a status request that is related to a support case 688540191 (business object associated to the external workspace). In the third user interface screen 730, the problem description, the current status, and the action plan is displayed at 732. The problem relates to a detected unexpected increase in the Domain Name System (DNS)

traffic to a particular host. The current status of the case is that the customer is monitoring the DNS traffic and will report back in five days. The action plan includes the customer monitoring the DNS traffic and upgrading software.

FIG. 8 is a flowchart of a method 800 for configuring a bot in a multi-user collaboration space or a virtual workspace, according to an example embodiment. The method 800 is performed by a bot application server. For example, the method 800 is performed by a bot application 410 executed on a server as shown in FIG. 4 and/or bot application server(s) 640 shown in FIG. 6.

At 802, a trusted business application add the bot, as a participant, to a virtual workspace that is a multi-user collaboration workspace. A trusted business application may send a request to add a bot. In response to the request, the collaboration orchestrator adds the bot as a participant.

At 804, the bot application server obtains context of the virtual workspace.

At 806, the bot application server sets a skill set for the bot from among a plurality of skill sets. The skill set varies based on the context of the virtual workspace.

At 808, the bot application server configures the bot to perform at least one task in the virtual workspace based on the skill set.

According to one or more example embodiments, the method 800 further includes detecting, by the bot application server, that the bot is connected to the multi-user collaboration workspace. The bot is a conversational chat bot and performs the at least one task in response to a request from another participant in the multi-user collaboration workspace.

In at least one instance, the operation 806 includes selecting an operational mode for the bot from among at least two modes with different skill sets based on the context indicating a collaboration workspace type.

In at least one other instance, the operation 806 includes dynamically changing the skill set of the bot based on an event occurring in the virtual workspace. The event includes one or more of adding a first participant to the virtual workspace or removing a second participant from the virtual workspace.

In yet at least one other instance, the operation 806 includes determining a security access level of each participant in the virtual workspace and setting the skill set for the bot based on a lowest security access level among a plurality of participants in the virtual workspace.

In one form, the operation 804 includes providing, by the bot application server to a collaboration orchestrator server or a primary trusted business application, an identifier of the virtual workspace and obtaining, by the bot application server from the collaboration orchestrator server or the primary trusted business application, the context of the virtual workspace determined by the collaboration orchestrator server or a primary trusted business application based on the identifier. The context includes one or more of a collaboration workspace type, a business object type, and a business object value.

According to one or more example embodiments, the operation 806 includes based on the collaboration workspace type being unknown, restricting the skill set of the bot to operate in a one-to-one virtual workspace.

According to one or more example embodiments, the operation 808 includes obtaining, from another participant of the virtual workspace, a request to perform the at least one task. Based on the collaboration workspace type, determining whether the at least one task specified in the request is within the skill set of the bot and based on the request being within the skill set of the bot, determining whether a business object specified in the request is consistent with the business object type of the virtual workspace. The operation 808 further includes, based on the business object type and a business object value specified in the request being consistent with the business object type and the business object value of the virtual workspace, determining security access levels of other participants in the virtual workspace with respect to the request and, based on the security access levels of the other participants meeting a predetermined security access threshold required for the request, performing, by the bot, the at least one task including providing information in the virtual workspace in response to the request.

In one form, the method 800 further includes providing, by the bot, an error message based on one of the security access levels of one of the other participants not meeting the predetermined security access threshold required by the request, or based on the request not being within the skill set of the bot, or based on the business object specified in the request not being consistent with the business object type of the virtual workspace.

FIG. 9 is a flowchart illustrating a method 900 for creating a multi-user collaboration space or a virtual workspace with bot participation, according to an example embodiment. The method 900 is performed by a collaboration orchestrator server(s) such as the collaboration orchestrator 102 in FIGS. 1, 2 and 4 and/or the virtual workspace server(s) 630 in FIG. 6.

At 902, the collaboration orchestrator server obtains, from a primary business application, a request to generate a virtual workspace in a business context. The virtual workspace is a multi-user collaboration workspace and the request includes a namespace in which configuration and authorization rules for a lifecycle of the virtual workspace are defined.

At 904, the collaboration orchestrator server generates the virtual workspace based on the configuration and authorization rules.

At 906, the collaboration orchestrator server adds, to the virtual workspace, a plurality of participants that include at least one user who accesses the virtual workspace through an endpoint device, and at least one bot, that are authorized by the configuration and authorization rules.

At 908, the collaboration orchestrator server provides, to a bot application server, business context of the virtual workspace to configure the bot with an unrestricted skill set or a restricted skill set.

In one or more example embodiments, the method 900 may further include the collaboration orchestrator server subscribing to events in the virtual workspace. The events include one or more of adding a first participant to the virtual workspace, deleting a second participant from the virtual workspace, or uploading a file to be shared in the virtual workspace.

In one form, the namespace includes a type of the virtual workspace to be generated, one or more use cases, and the configuration and authorization rules for creating the virtual workspace, during active use of the virtual workspace, and for deleting the virtual workspace. The method 900 further includes the collaboration orchestrator server configuring a collaboration platform server to post and/or export information in the virtual workspace based on the configuration and authorization rules during the active use of the virtual workspace and configuring the collaboration platform server to delete the virtual workspace based on a delete request from a trusted business application specified in the configuration and authorization rules.

In one instance, the namespace includes one or more trusted business applications that are authorized and related to the business context. The method 900 further includes the collaboration orchestrator server providing, to the bot, context of the virtual workspace such that the bot is configured to respond to one or more requests from other participants in the virtual workspace based on the context of the virtual workspace and a lowest security access level from among the other participants in the virtual workspace.

According to one or more example embodiments, the method 900 further includes the collaboration orchestrator server providing, to the bot, context of the virtual workspace such that the bot is configured to operate with a limited skill set based on the context of the virtual workspace indicating an external workspace type and is configured to operate with a full skill set based on the context of the virtual workspace indicating an internal workspace type.

Figure 10:
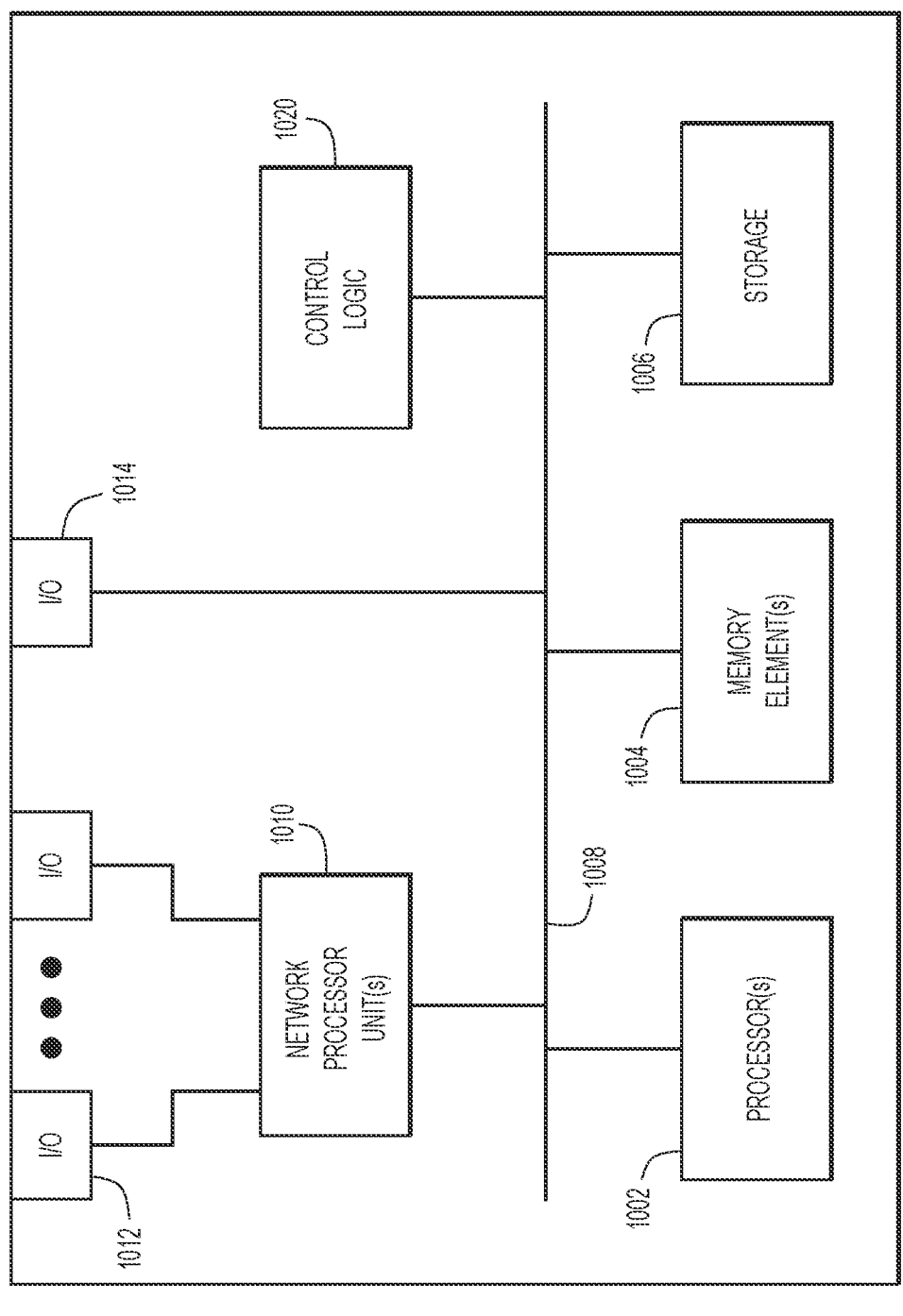
FIG. 10 is a block diagram of computing device that may be configured to participate in the methods presented herein, according to various example embodiments.

Reference is now made to FIG. 10. FIG. 10 illustrates a hardware block diagram of a computing device 1000 that may perform the functions discussed herein in connection with the techniques depicted in FIGS. 1-6, 8, and 9. In various embodiments, a computing device, such as computing device 1000 or any combination of computing devices 1000, may be configured as any entity/entities as discussed for the techniques depicted in connection with FIGS. 1-6, 8, and 9 in order to perform operations of the various techniques discussed herein.

In at least one embodiment, computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory elements 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interfaces 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In still another example embodiment, an apparatus is a bot application server. The apparatus includes a communication interface configured to enable network communications, a memory configured to store executable instructions, and a processor coupled to the communication interface and the memory. The processor is configured to perform operations that include adding a bot, as a participant, to a virtual workspace that is a multi-user collaboration workspace and obtaining context of the virtual workspace. The operations further include setting a skill set for the bot from among a plurality of skill sets, where the skill set varies based on the context of the virtual workspace and configuring the bot to perform at least one task in the virtual workspace based on the skill set.

According to one or more example embodiments, the processor is further configured to detect that the bot is connected to the multi-user collaboration workspace. The bot is a conversational chat bot and performs the at least one task in response to a request from another participant in the multi-user collaboration workspace.

In one form, the processor is configured to set the skill set for the bot by, selecting an operational mode for the bot from among at least two modes with different skill sets based on the context indicating a collaboration workspace type.

In one instance, the processor may further be configured to set the skill set for the bot by dynamically changing the skill set of the bot based on an event occurring in the virtual workspace. The event includes one or more of adding a first participant to the virtual workspace or removing a second participant from the virtual workspace.

According to one or more example embodiments, the processor is configured to set the skill set for the bot by determining a security access level of each participant in the virtual workspace and setting the skill set for the bot based on a lowest security access level among a plurality of participants in the virtual workspace.

In at least one instance, the processor is further configured to obtain the context of the virtual workspace by providing, to a collaboration orchestrator server or a primary trusted business application, an identifier of the virtual workspace and by obtaining, from the collaboration orchestrator server or the primary trusted business application, the context of the virtual workspace determined by the collaboration orchestrator server or the primary trusted business application based on the identifier. The context includes one or more of a collaboration workspace type, a business object type, and a business object value.

In yet another example embodiment, one or more non-transitory computer readable storage media encoded with instructions are provided. When the media is executed by the processor, the instructions cause the processor to perform the operations explained above with reference to FIGS. 1-6, 8, and 9.

In yet another example embodiment, a system is provided that includes the devices and operations explained above with reference to FIGS. 1-6, 8, and 9.

The programs described herein (e.g., control logic 1020) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1006 and/or memory elements(s) 1004 can store data, software, code, instructions (e.g., processor instructions), logic, parameters, combinations thereof, and/or the like used for operations described herein. This includes the storage 1006 and/or memory elements(s) 1004 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks such as the network 650, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, by a collaboration orchestrator server from a primary application, a request to generate a virtual workspace in a context, wherein the virtual workspace is a multi-user collaboration workspace and the request includes a namespace in which configuration and authorization rules for a lifecycle of the virtual workspace are defined;

generating, by the collaboration orchestrator server, the virtual workspace based on the configuration and authorization rules;

adding, by the collaboration orchestrator server, to the virtual workspace, a plurality of participants that include at least one user who accesses the virtual workspace through an endpoint device, and at least one bot, that are authorized by the configuration and authorization rules, wherein the at least one bot interacts conversationally as a participant with the at least one user;

in response to the at least one bot being added to the virtual workspace, obtaining, by the collaboration orchestrator server from a bot application server, a query for the context of the virtual workspace; and in response to the query, providing, by the collaboration orchestrator server to the bot application server, the context of the virtual workspace used to configure the at least one bot with an unrestricted skill set or a restricted skill set for conversing with the at least one user based on the context.

2. The method of claim 1, further comprising:

subscribing, by the collaboration orchestrator server, to events in the virtual workspace, the events comprising one or more of adding a first participant to the virtual workspace, deleting a second participant from the virtual workspace, or uploading a file to be shared in the virtual workspace.

3. The method of claim 2, further comprising:

instructing, by the collaboration orchestrator server, the at least one bot to dynamically change between the unrestricted skill set and the restricted skill set based on one or more of the events occurring in the virtual workspace.

4. The method of claim 1, wherein the namespace includes a type of the virtual workspace to be generated, one or more use cases, and the configuration and authorization rules for creating the virtual workspace, during active use of the virtual workspace, and for deleting the virtual workspace, the method further comprising:

configuring, by the collaboration orchestrator server, a collaboration platform server to post and/or export information in the virtual workspace based on the configuration and authorization rules during the active use of the virtual workspace; and configuring, by the collaboration orchestrator server, the collaboration platform server to delete the virtual workspace based on a delete request from a trusted application specified in the configuration and authorization rules.

5. The method of claim 1, wherein the namespace includes one or more trusted applications that are authorized and related to the context, the method further comprising:

providing, by the collaboration orchestrator server, the context of the virtual workspace such that the at least one bot is configured to respond to one or more requests from other participants in the virtual workspace based on the context of the virtual workspace and a lowest security access level from among the other participants in the virtual workspace.

6. The method of claim 1, further comprising:

providing, by the collaboration orchestrator server to the at least one bet, the context of the virtual workspace such that the at least one bot is configured to operate with a limited skill set based on the context of the virtual workspace indicating an external workspace type and is configured to operate with a full skill set based on the context of the virtual workspace indicating an internal workspace type.

7. The method of claim 1, wherein the at least one bot is configured to filter content being provided in the multi-user collaboration workspace based on a configured skill set from among the unrestricted skill set and the restricted skill set.

8. The method of claim 1, wherein the at least one bot interacts with the at least one user in the multi-user collaboration workspace or a one-to-one workspace depending on the context.

9. An apparatus comprising:

a communication interface configured to enable network communications;

a memory configured to store executable instructions; and a processor coupled to the communication interface and the memory and configured to perform operations including:

obtaining, from a primary application, a request to generate a virtual workspace in a context, wherein the virtual workspace is a multi-user collaboration workspace and the request includes a namespace in which configuration and authorization rules for a lifecycle of the virtual workspace are defined;

generating the virtual workspace based on the configuration and authorization rules;

adding, to the virtual workspace, a plurality of participants that include at least one user who accesses the virtual workspace through an endpoint device, and at least one bot, that are authorized by the configuration and authorization rules, wherein the at least one bot interacts conversationally as a participant with the at least one user;

in response to the at least one bot being added to the virtual workspace, obtaining, from a bot application server, a query for the context of the virtual workspace; and in response to the query, providing, to the bot application server, the context of the virtual workspace used to configure the at least one bot with an unrestricted skill set or a restricted skill set for conversing with the at least one user based on the context.

10. The apparatus of claim 9, wherein the processor is further configured to perform:

subscribing to events in the virtual workspace, the events comprising one or more of adding a first participant to the virtual workspace, deleting a second participant from the virtual workspace, or uploading a file to be shared in the virtual workspace.

11. The apparatus of claim 10, wherein the processor is further configured to perform:

instructing the at least one bot to dynamically change between the unrestricted skill set and the restricted skill set based on one or more of the events occurring in the virtual workspace.

12. The apparatus of claim 9, wherein the namespace includes a type of the virtual workspace to be generated, one or more use cases, and the configuration and authorization rules for creating the virtual workspace, during active use of the virtual workspace, and for deleting the virtual workspace, the processor is further configured to perform:

configuring a collaboration platform server to post and/or export information in the virtual workspace based on the configuration and authorization rules during the active use of the virtual workspace; and configuring the collaboration platform server to delete the virtual workspace based on a delete request from a trusted application specified in the configuration and authorization rules.

13. The apparatus of claim 9, wherein the namespace includes one or more trusted applications that are authorized and related to the context, the processor is further configured to perform:

providing the context of the virtual workspace such that the at least one bot is configured to respond to one or more requests from other participants in the virtual workspace based on the context of the virtual workspace and a lowest security access level from among the other participants in the virtual workspace.

14. The apparatus of claim 9, wherein the processor is further configured to perform:

providing the context of the virtual workspace such that the at least one bot is configured to operate with a limited skill set based on the context of the virtual workspace indicating an external workspace type and is configured to operate with a full skill set based on the context of the virtual workspace indicating an internal workspace type.

15. The apparatus of claim 9, wherein the at least one bot is configured to filter content being provided in the multi-user collaboration workspace based on a configured skill set from among the unrestricted skill set and the restricted skill set.

16. One or more non-transitory computer readable storage media encoded with software comprising computer executable instructions that, when executed by a processor, cause the processor to perform a method including:

obtaining, from a primary application, a request to generate a virtual workspace in a context, wherein the virtual workspace is a multi-user collaboration workspace and the request includes a namespace in which configuration and authorization rules for a lifecycle of the virtual workspace are defined;

generating the virtual workspace based on the configuration and authorization rules;

adding, to the virtual workspace, a plurality of participants that include at least one user who accesses the virtual workspace through an endpoint device, and at least one bot, that are authorized by the configuration and authorization rules, wherein the at least one bot interacts conversationally as a participant with the at least one user;

in response to the at least one bot being added to the virtual workspace, obtaining, from a bot application server, a query for the context of the virtual workspace; and in response to the query, providing, to the bot application server, the context of the virtual workspace used to configure the at least one bot with an unrestricted skill set or a restricted skill set for conversing with the at least one user based on the context.

17. The one or more non-transitory computer readable storage media according to claim 16, wherein the computer executable instructions further cause the processor to perform:

subscribing to events in the virtual workspace, the events comprising one or more of adding a first participant to the virtual workspace, deleting a second participant from the virtual workspace, or uploading a file to be shared in the virtual workspace.

18. The one or more non-transitory computer readable storage media according to claim 17, wherein the computer executable instructions further cause the processor to perform:

instructing the at least one bot to dynamically change between the unrestricted skill set and the restricted skill set based on one or more of the events occurring in the virtual workspace.

19. The one or more non-transitory computer readable storage media according to claim 17, wherein the namespace includes one or more trusted applications that are authorized and related to the context and wherein the computer executable instructions further cause the processor to:

providing, to the bot application server, the context of the virtual workspace such that the at least one bot is configured to respond to one or more requests from other participants in the virtual workspace based on the context of the virtual workspace and a lowest security access level from among the other participants in the virtual workspace.

20. The one or more non-transitory computer readable storage media according to claim 16, wherein the namespace includes a type of the virtual workspace to be generated, one or more use cases, and the configuration and authorization rules for creating the virtual workspace, during active use of the virtual workspace, and for deleting the virtual workspace, wherein the computer executable instructions further cause the processor to perform:

configuring a collaboration platform server to post and/or export information in the virtual workspace based on the configuration and authorization rules during the active use of the virtual workspace; and configuring the collaboration platform server to delete the virtual workspace based on a delete request from a trusted application specified in the configuration and authorization rules.

\*    \*    \*    \*    \*